(12) United States Patent
Lubineau et al.

(10) Patent No.: US 12,405,102 B2
(45) Date of Patent: Sep. 2, 2025

(54) SUPER-SENSITIVE CAPACITIVE STRAIN SENSOR WITH ELECTRODE FRAGMENTATION

(71) Applicant: KING ABDULLAH UNIVERSITY OF SCIENCE AND TECHNOLOGY, Thuwal (SA)

(72) Inventors: Gilles Lubineau, Thuwal (SA); Hussein Nesser, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 303 days.

(21) Appl. No.: 17/912,325

(22) PCT Filed: Mar. 23, 2021

(86) PCT No.: PCT/IB2021/052403
§ 371 (c)(1),
(2) Date: Sep. 16, 2022

(87) PCT Pub. No.: WO2021/198847
PCT Pub. Date: Oct. 7, 2021

(65) Prior Publication Data
US 2023/0146683 A1    May 11, 2023

Related U.S. Application Data

(60) Provisional application No. 63/002,850, filed on Mar. 31, 2020.

(51) Int. Cl.
*B32B 3/30*    (2006.01)
*B32B 27/10*   (2006.01)
(Continued)

(52) U.S. Cl.
CPC ............ *G01B 7/22* (2013.01); *B32B 3/30* (2013.01); *B32B 27/10* (2013.01); *B32B 29/002* (2013.01);
(Continued)

(58) Field of Classification Search
CPC .. G01B 21/32; G01B 7/18; G01B 7/22; G01L 1/18; G01L 1/142; G01L 5/228;
(Continued)

(56) References Cited

U.S. PATENT DOCUMENTS

2009/0249885 A1* 10/2009 Shkel ............... G01B 7/22
                                                         73/780
2016/0018275 A1*  1/2016 Kaneko ............ G01B 7/22
                                                         73/862.626

FOREIGN PATENT DOCUMENTS

KR     20200016505 A   *  2/2020 ......... H01M 4/9083
WO     2011066028 A2      6/2011
WO     WO-2015053638 A1 * 4/2015 ......... A61N 1/36014

OTHER PUBLICATIONS

Amjadi, M., et al., "Ultra-Stretchable and Skin-Mountable Strain Sensors Using Carbon Nanotubes-Ecoflex Nanocomposites," Nanotechnology, 2015, vol. 26, pp. 375501 (1-11), IOP Publishing Ltd.

(Continued)

*Primary Examiner* — Brandi N Hopkins
(74) *Attorney, Agent, or Firm* — PATENT PORTFOLIO BUILDERS PLLC

(57) ABSTRACT

A capacitive strain sensor configured to measure a strain includes a dielectric layer; a first electrode placed on a first face of the dielectric layer; and a second electrode placed on a second face, opposite to the first face, of the dielectric layer. The first electrode is formed of a single-walled carbon nanotube paper, and the single-walled carbon nanotube paper has plural pre-cracks made according to a pattern.

21 Claims, 23 Drawing Sheets

(51) Int. Cl.
    *B32B 29/00*     (2006.01)
    *G01B 7/16*     (2006.01)
    *G01L 1/14*     (2006.01)

(52) U.S. Cl.
    CPC ..... *B32B 2250/40* (2013.01); *B32B 2307/732* (2013.01); *B32B 2457/16* (2013.01)

(58) Field of Classification Search
    CPC .. G01L 1/14; G01L 1/146; A61N 1/05; A61B 5/4851; A61B 5/263; A61B 5/0022; B32B 3/30; B32B 27/10; B32B 29/002; B32B 2250/40; B32B 2307/732; B32B 2457/16; G01P 15/125; B64D 45/00
    See application file for complete search history.

(56) References Cited

OTHER PUBLICATIONS

Cai, L., et al. "Super-Stretchable, Transparent Carbon Nanotube-Based Capacitive Strain Sensors for Human Motion Detection," Scientific Reports, Oct. 25, 2013, vol. 3, No. 1, pp. 3048 (1-8).

Carpi, F., et al., "Dielectric Elastomers as Electromechanical Transducers: Fundamentals, Materials, Devices, Models and Applications of an Emerging Electroactive Polymer Technology," 2011, Chapters 1-3, 10, 11 and 18, Elsevier.

International Search Report in corresponding/related International Application No. PCT/IB2021/052403, date of mailing Jul. 20, 2021.

Kim, S.-R., et al., "Wearable and Transparent Capacitive Strain Sensor with High Sensitivity Based on Patterned Ag Nanowire Networks," ACS Applied Materials & Interfaces, Jul. 21, 2017, vol. 9, No. 31, pp. 26407-26416, ACS Publications.

Nesser, H., et al., "Towards Wireless Highly Sensitive Capacitive Strain Sensors Based on Gold Colloidal Nanoparticles," Nanoscale, Apr. 27, 2018, vol. 10, No. 22, pp. 10479-10487, the Royal Society of Chemistry.

Nur, R., et al., "A Highly Sensitive Capacitive-Type Strain Sensor Using Wrinkled Ultrathin Gold Films," Nano Letters, Aug. 2, 2018, vol. 18, No. 9, pp. 5610-5617, ACS Publications.

Written Opinion of the International Searching Authority in corresponding/related International Application No. PCT/IB2021/052403, date of mailing Jul. 20, 2021.

Xin, Y., "Making a Bilateral Compression/Tension Sensor by Pre-Stretching Open-Crack Networks in Carbon Nanotube Papers," ACS Applied Materials & Interfaces, Sep. 13, 2018, pp. 33507-33515.

Xin, Y., et al., "Laser-Engraved Carbon Nanotube Paper for Instilling High Sensitivity, High Stretchability, and High Linearity in Strain Sensors," Nanoscale, Jun. 19, 2017, vol. 9, No. 30, pp. 10897-10905, The Royal Society of Chemistry.

Xu, D., et al., "Stretch Not Flex: Programmable Rubber Keyboard," Smart Materials and Structures, Nov. 24, 2015, vol. 25, No. 1, pp. 015012 (1-7), IOP Publishing.

Xu, D., et al., "Where the Rubber Meets the Hand: Unlocking the Sensing Potential of Dielectric Elastomers," Journal of Polymer Science, Part B Polymer Physics, Oct. 6, 2015, vol. 54, No. 4, pp. 465-472, Wiley Periodicals, Inc.

Yao, S., et al., "Wearable Multifunctional Sensors Using Printed Stretchable Conductors Made of Silver Nanowires," Nanoscale, Dec. 5, 2013, vol. 6, No. 4, pp. 2345-2352, Royal Society of Chemistry.

Communication pursuant to Article 94(3) EPC, in corresponding/related European Application No. 21714681.0, dated Dec. 13, 2024.

\* cited by examiner

SUPER-SENSITIVE CAPACITIVE STRAIN SENSOR WITH ELECTRODE FRAGMENTATION

CROSS-REFERENCE TO RELATED APPLICATIONS

This application is a U.S. National Stage Application of International Application No. PCT/IB2021/052403, filed on Mar. 23, 2021, which claims priority to U.S. Provisional Patent Application No. 63/002,850, filed on Mar. 31, 2020, entitled "HIGHLY SENSITIVE CAPACITIVE STRAIN SENSORS BASED ON FRAGMENTED ELECTRODES," the disclosures of which are incorporated herein by reference in their entirety.

BACKGROUND

Technical Field

Embodiments of the subject matter disclosed herein generally relate to a capacitive strain sensor and method for measuring the strain, and more particularly, to a sensor based on a dielectric layer laminated between two electrodes that, by design, experience a significant change in resistance when stretched due to the fact that at least one of the electrodes is fragmented.

Discussion of the Background

Monitoring strain in various structures is an ongoing concern for engineers that has become even more relevant with the recent emergence of flexible and stretchable electronic appliances. Strain sensors are now in high demand in various fields, such as health monitoring, sports performance monitoring, virtual reality and entertainment technology, human-machine interfaces, and soft robotics. In some applications (e.g., crack detection in structures and composites and medical sensing inside the human body), the rigid circuit interface and the wired connection can compromise the application and affect the reliability of the flexible strain sensor. A strain sensor generally transduces a mechanical deformation into an electrical signal through changes in its resistance or capacitance [1], [2].

Conventional resistive strain sensors have disadvantages in wireless applications due to their low-impedance and high-power consumption. Meanwhile, capacitive strain sensors are appealing for the wireless system design for in-situ and in-service monitoring. Wireless detection can be achieved with capacitive strain sensors by integrating them into LC resonant circuits, which makes the readout electronics manageable.

Several studies confirmed that capacitive strain sensing surpasses resistance strain sensing for most classical performance indicators. Nevertheless, the sensitivity of such sensors, when quantified by the gauge factor (GF), is the main limitation today for a wide adoption of the capacitive strain sensors. Conventional flexible capacitive sensors consist of a parallel plate capacitor. A change in the capacitance under strain is ascribed to a change in the sensor's geometry. According to this model, the maximum GF that can be achieved with a traditional capacitive strain sensor is 1, which limits the capability of detecting a subtle motion.

Further studies have attempted to increase the sensitivity of the capacitive strain sensors using new methods of varying the capacitance under mechanical deformation. The authors of [3] achieved a GF that was slightly above 3 for a maximum applied strain of 140% by utilizing an ultrathin, wrinkled gold-film electrode. Another study [4] used the electron transport mechanism between gold nanoparticles. A GF of 3.5 was achieved for the low strain of 1.5%. Changing the shape to move away from the simple parallel plate design was also suggested to optimize the sensor's sensitivity. An interdigitated capacitive strain sensor fabricated by silver nanowire networks achieved a GF of 2 at 30% strain. However, these advances are still limited and insufficient to compete with the more commonly used resistive strain sensors [5].

This relatively low sensitivity of the capacitive strain sensors is still insufficient for detecting a low strain inside some structures. More sensitive strain sensors operating on radio frequencies (i.e., without contact and remote-controlled) would have tremendous applications in various embedded systems. Civil engineering, for example, could benefit from this system because the structure's safety is often endangered by very small dimensional changes that later degenerate into large cracks, which typically is the case for the concrete damage that starts with the oxidation-driven expansion of rebars. Highly sensitive in-plane strain sensors are also needed to develop electronic skins capable of monitoring the vibrations of smart and morphing structures such that these do not result in unstable behaviors or to control the coming generations of soft robots for which an accurate feedback on deformation is needed to achieve the proper motion.

Thus, there is a need for a new capacitive strain sensor that is capable of having a larger gauge factor for detecting a very low strain.

BRIEF SUMMARY OF THE INVENTION

According to an embodiment, there is a capacitive strain sensor configured to measure a strain. The sensor includes a dielectric layer, a first electrode placed on a first face of the dielectric layer, and a second electrode placed on a second face, opposite to the first face, of the dielectric layer. The first electrode is formed of a single-walled carbon nanotube paper. The single-walled carbon nanotube paper has plural pre-cracks made according to a pattern.

According to another embodiment, there is a method for making a capacitive strain sensor. The method includes providing a dielectric layer, forming a first electrode from a single-walled carbon nanotube paper, cutting plural pre-cracks into the single-walled carbon nanotube paper according to a given pattern, placing the first electrode on a first face of the dielectric layer, forming a second electrode from the single-walled carbon nanotube paper, and placing the second electrode on a second face, opposite to the first face, of the dielectric layer.

According to yet another embodiment, there is a capacitive strain sensor configured to measure a strain. The sensor includes a dielectric layer, a first electrode placed on a first face of the dielectric layer, a second electrode placed on a second face, opposite to the first face, of the dielectric layer, and an inductor connected between the first electrode and the second electrode and configured to receive an interrogation signal and generate a signal indicative of a strain applied to the sensor. The first electrode is formed of a single-walled carbon nanotube paper. The single-walled carbon nanotube paper has plural pre-cracks made according to a pattern.

BRIEF DESCRIPTION OF THE DRAWINGS

For a more complete understanding of the present invention, reference is now made to the following descriptions taken in conjunction with the accompanying drawings, in which:

FIGS. 9A, 9C, and 9D illustrate various parameters of the capacitive sensor with fragmented electrodes as a function of the applied strain, cycle number and time, respectively, while

FIG. 11A shows the penetration of a signal into a traditional capacitive sensor while

DETAILED DESCRIPTION OF THE INVENTION

Figure 1A:
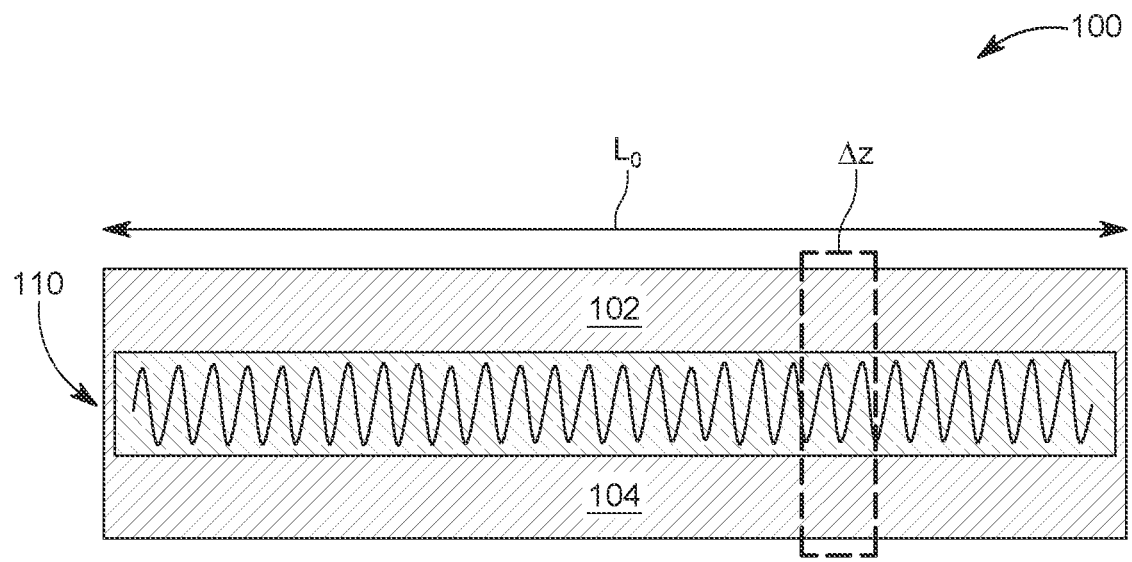
FIG. 1A is a schematic diagram of a traditional capacitor and FIG. 1B is an electrical model of the capacitance associated with the capacitor of FIG. 1A.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a dielectric elastomer layer laminated between two fragmented electrodes (i.e., carbon nanotube papers) that, by design, experiences a significant change in resistance (from Ω to MΩ) when stretched and makes the sensor behave as a transmission line. The strain-dependent voltage attenuation over the structure length results in a large variation of the effective capacitance (gauge factor exceeding 37 at 3% strain). However, the embodiments to be discussed next are not limited to the materials or the values noted above, but may be applied to other material to achieve different gauge factors for different strains. Also, the embodiments discussed herein are not limited to a capacitor having two fragmented electrodes, but may be applied to a capacitor having only one fragmented electrode.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel mechanism is used for developing ultra-sensitive strain sensors compatible with wireless communication, which results in easy-to-install and low-cost sensing elements. In this embodiment, a high GF capacitive strain sensor is achieved by introducing one or two fragmented electrodes with a high and strain-dependent resistance. A parallel plate-type capacitive strain sensor is configured to use a fragmented carbon nanotube (CNT) paper-like electrode developed and characterized to achieve a high resistivity variation under strain. This fragmented CNT paper was developed in [6] to have ultra-high sensitivity and high stretchability with a GF of over $4.2 \times 10^4$ at 150% strain. Note that other materials may be used for the electrode as long as conductive strands of material are present and their relative position can be rearranged when applying a strain to the electrode. The fragmented electrode resistance significantly changes under stretching. Thus, the loss in electrode conductivity affects the voltage dissipation on a transmission circuit model. This phenomenon makes the virtual length of the sensor change, resulting in a variation in the effective capacitance. This process results in a large capacitive GF activated by sensor stretching, which is now discussed in more detail.

Before discussing the configuration of this ultra-sensitive capacitive strain sensor, the transmission line model used in the telecommunication field is briefly discussed, as the sensor takes advantage of this model. The transmission line model is used in the radio and telecommunications engineering to describe any physical structure that guides electromagnetic waves. A dielectric capacitor (DEC) is a deformable and flexible thin film usually including an elastomer sandwiched between compliant electrodes [7]. Accordingly, many studies have been conducted to explain the propagation behaviour of an electrical signal in a typical DEC with a high electrode resistance. These studies indicated that at a radio frequency (RF) and for high-resistance electrodes (i.e., in the range of kΩ or higher), the electrical model of a dielectric capacitor can be considered as a transmission line model. Graf and Maas (C. Graf and J. Maas, "A model of the electrodynamic field distribution for optimized electrode design for dielectric electroactive polymer transducers," *Smart Mater. Struct.*, vol. 21, no. 9, p. 094001, August 2012, doi: 10.1088/0964-1726/21/9/094001) discussed the implications of electrode resistance and contact placement on the DE capacitor performance. They developed an analytical model to show the alternative signal propagation in a DE elastomer-based transmission line model. A capacitor-based DE between two resistive electrodes can be represented as distributed R-C chains at high frequencies. Such distributed transmission line models have been applied to DE actuators by discretizing actuators or sensors into R-C elements. The authors in [8], [9] utilized the transmission line model for sensing local pressure on a single DE sensor by observing the capacitance variation and simultaneously applying sinusoidal excitation signals with different frequencies.

Figure 1B:
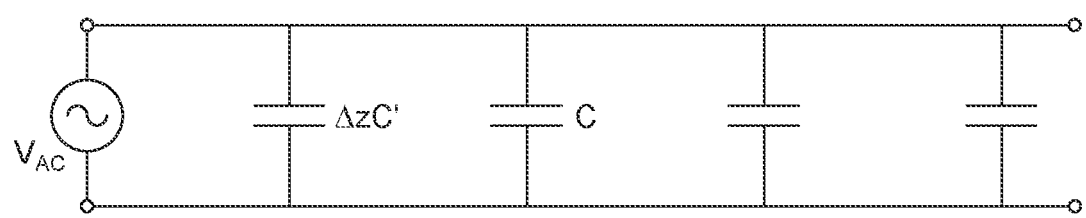

In this regard, FIGS. 1A and 1B show the effect of the electrode resistance on the signal propagation in a DE capacitor 100 having the dielectric material 110 sandwiched between low resistance electrode plates 102 and 104 (see FIG. 1A). For the ideal electrodes, the DEC 100 behaves like a conventional capacitor. If the negligible electrode resistance is taken into account, the system 100 can be modelled as shown in FIG. 1B, as smaller capacitors distributed, in parallel, over infinity segments (Δz). However, if a DEC 200 (see FIG. 2A) has electrodes 202 and 204 configured as high-resistance electrodes, as the electrodes are fragmented, the DEC 200 behaves according to the transmission line model (see FIG. 2B) and this model is represented as a network of coupled resistances r (from the electrodes) and capacitances c spread over the sensor length L, with C being the capacitance for the entire sensor, i.e., c=ΔzC'. The high-resistance of the electrodes 202 and 204 involved in the model shown in FIG. 2B results from the existence of the barely opened cracks 220 in the electrodes. Note that from a modeling point of view, the top and bottom electrode resistances can be combined as two resistances in series.

The electrical signal attenuation in the DEC can be studied using an analytical model derived from the telegrapher's equations on an electrical transmission line. The traveling voltage wave along the structure length (z-direction) is affected by an attenuation factor (α) as follows:

$$V(z)=V_0 e^{-\alpha z}\cos(2\pi ft-\beta z), \quad (1)$$

where $\cos(2\pi ft-\beta z)$ is the oscillation factor of the sinusoidal signal with a phase constant β, f is the frequency, t is the time, and $V_0$ is the magnitude of the alternative input voltage ($V_{AC}$). The attenuation factor α for the traveling voltage wave is presented as follows:

$$\alpha=\sqrt{\pi f R'C'}. \quad (2)$$

The attenuation factor α depends on the interrogation signal's frequency f, on the capacitance per unit length $C'=C/L=C_0/L_0$, and on the electrode resistance per unit length $R'=R/L$. The total electrode resistance R varies with the number of cracks and their opening along the structure length L, where C is the total capacitance of the whole structure 200 under stretch, L is the length under stretch, and the capacitance C and the length L under strain relate to the initial capacitance $C_0$ and initial length $L_0$ (no strain) as follows:

$$C=C_0(1+\varepsilon) \text{ and } L=L_0(1+\varepsilon), \quad (3)$$

where ε is the applied strain, and $C_0$ and $L_0$ are the capacitance and the sensor length at rest, respectively.

Figure 2A:
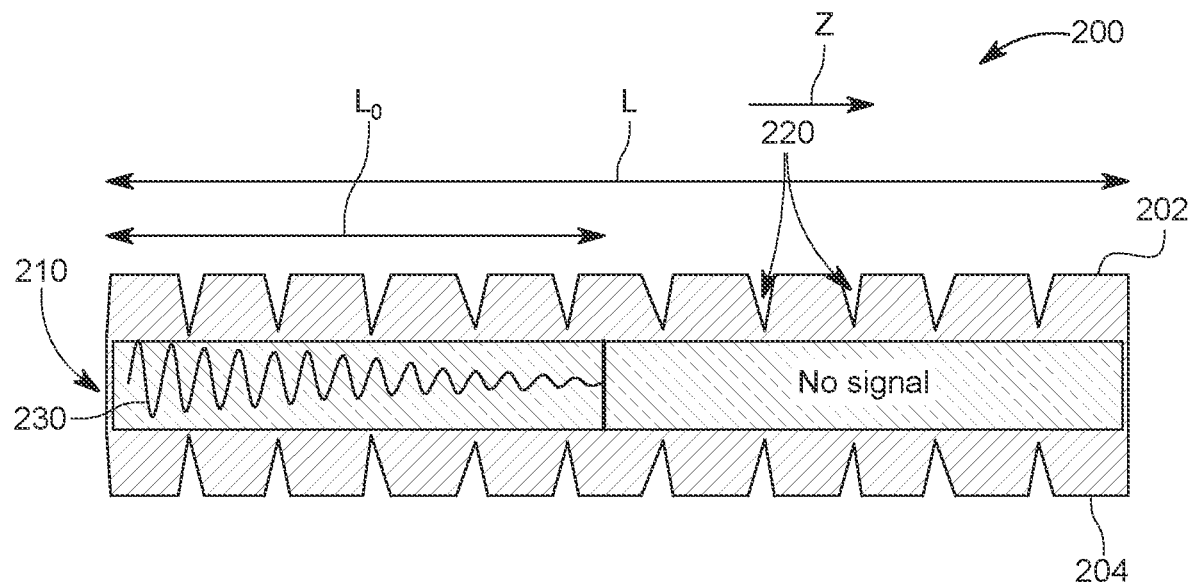
FIG. 2A is a schematic diagram of a novel capacitor having fragmented electrodes and FIG. 2B is a model of the capacitance associated with the capacitor of FIG. 2A.
Figure 2B:
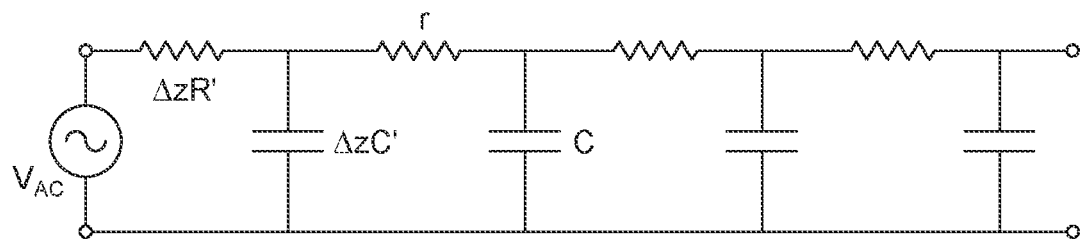

While C' is independent of the strain, R' is strongly strain-dependent due to the progressive opening of the cracks 220, which results in a reduction of the global effective conductivity of these electrodes. FIG. 2A shows that it is possible, due to the increase in the resistance of the electrodes 202 and 204 due to the cracks 220, that a signal 230 stops propagating along the entire length of the DEC 200, which is not the case for the DEC 100 in FIG. 1A. This means that the resistance of the electrode plates 202 and 204 has increased so much, from ohms to kiloohms, due to the cracks, that the high-electrode resistance stops the propagation of the signal after a certain length. The signal attenuation change the capacitance of the sensor so that an increase of the GF of the entire sensor more than 1 is possible, as now discussed.

From this model of the transmission line, the electrode resistance and how this resistance changes with strain largely determine the response of the parallel plate capacitor 200 in the RF domain. In a previous study [6], one of the inventors has demonstrated that a fragmented single-walled carbon nanotube (SWCNT) paper embedded in poly(dimethylsiloxane) (PDMS) has a very high piezoresistive GF of over $10^7$ at 50% strain, resulting in a very effective piezoresistive strain sensor. The high sensitivity of the fragmented CNT paper was related to its low initial electrical resistance (5-28Ω) and the extremely high variation of this resistance under strain (up to 1 MΩ) governed by the percolated network of the SWCNT in the cracked region. Note that the single-walled carbon nanotubes have a diameter in the range of about 1 nm. In this embodiment, this fragmented SWCNT paper is used for the electrodes 202 and 204 and then these electrodes are superimposed over the top and bottom of the dielectric layer to produce a capacitor with variable resistance electrodes as illustrated in FIG. 2A.

A method for making the capacitive strain sensor 200 is now discussed. In this embodiment, the capacitive strain sensor 200 is a parallel plate capacitor having two CNT layers 202 and 204 separated by a PDMS layer 210, and the entire device is encapsulated between PDMS layers on both sides. Thus, the dielectric layer and the two electrodes are fully encapsulated by a protective layer. FIGS. 3A to 3F describe the fabrication process of the stretchable strain sensor 200 based on fragmented electrodes. Note that this is one of a number of possible technical realizations used herein for demonstration, and other materials could be used to realize such fragmented electrodes. Also note that this embodiment uses two fragmented electrodes. However, it is possible to manufacture the strain sensor with only one fragmented electrode.

Figure 3A:
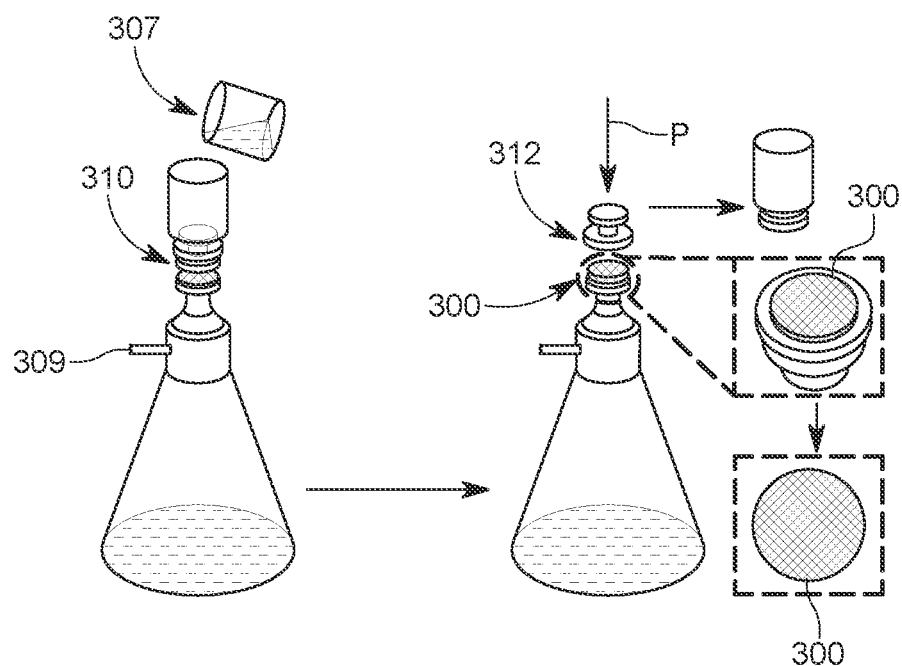
FIGS. 3A to 3F illustrate various phases of making a fragmented electrode capacitive sensor and also various cross-sections of the sensor itself.

Starting with FIG. 3A, a vacuum filtration method is used to produce a homogenous and thin SWCNT paper 300. The standard dimensions of the circular CNT sheet 300 after filtration and pressure-based consolidation were 47 mm diameter and 90 μm thickness. Other dimensions may be used. The thickness of the SWCNT paper 300 can be about 100 μm, +/−20%. To obtain the paper 300, a 0.5 wt. % SWCNT doped with 2.7 wt. % COOH groups was dispersed in methanesulfonic acid ($CH_3SO_3H$) to create a liquid solvent 307. The SWCNT/$CH_3SO_3H$ solvent was sonicated using a sonicator (250 W) for 60 min then stirred for 12 h at 500 rpm. A volume of 12 g of the solvent dispersion 307 was vacuum-filtered 309 through a ceramic filtration membrane 310 (e.g., pore size: 20 nm). The $CH_3SO_3H$ was then removed, by applying a pressure P and using filtration membrane 312, from the solution after 12 h to obtain the SWCNT paper 300 of 47 mm or 80 mm diameter and 90 μm thickness H. These parameters are controllable by changing the SWCNT concentration in the acid solution or by adjusting the solvent quantity. In one application, these dimensions are varied by about up to +/−20%.

Figure 3B:
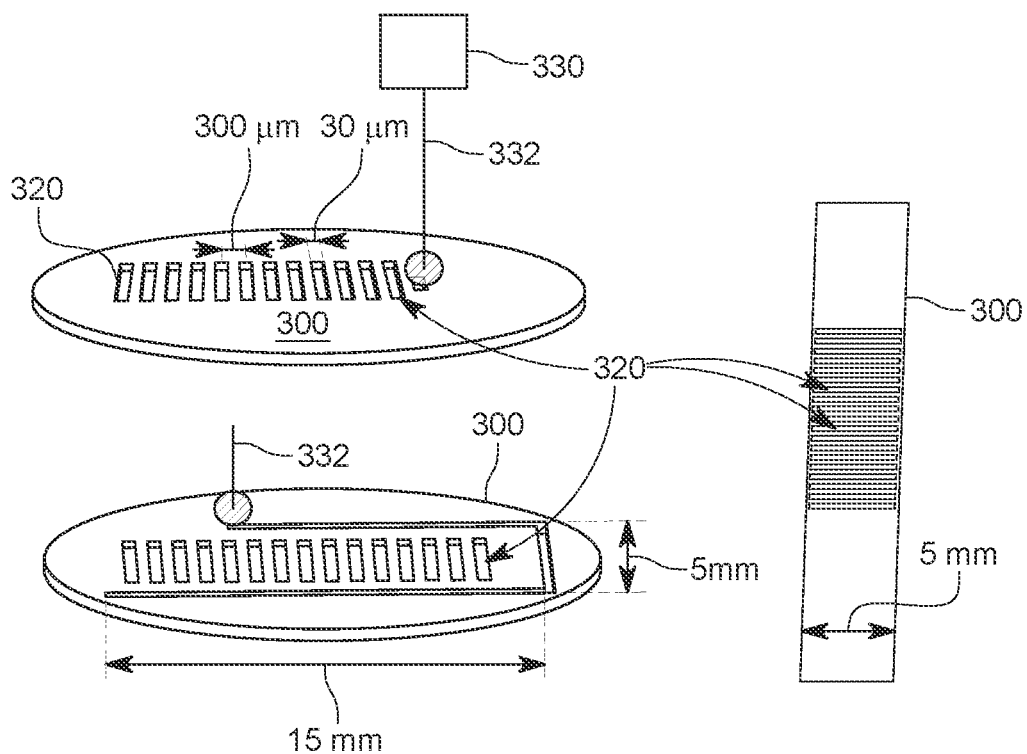
Figure 3C:
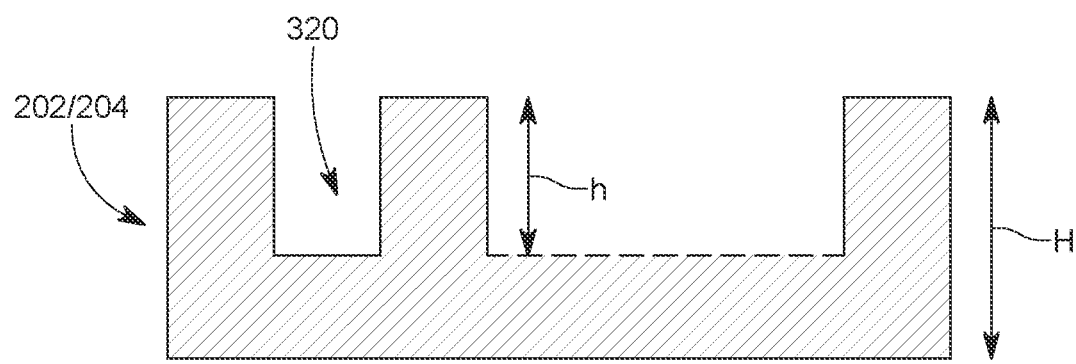

Next, the plural cracks 220 need to be formed into the CNT paper 300. This step is shown in FIG. 3B and is achieved by making pre-cracks 320 into the CNT paper 300, following a pre-designed pattern of the pre-cracks. The pre-cracks 320 serve as crack initiators when mechanical loading is applied to the capacitor 300. This means that the pre-cracks 320 transform or become the cracks 220 after strain is applied to the paper 300. The pre-designed pattern in this embodiment includes parallel lines. However, the pre-designed pattern may include wavy lines, or lines defined by a given parametric equation, etc. The pre-cracks are introduced into the CNT paper 300, in this embodiment, using a multi-wavelength laser platform 330, for example, a 1.06 μm fiber laser source. The laser beam 332 generated by the laser source 330 removes material from the paper 300 to make the pre-cracks 320. The pre-cracking depth h, which is illustrated in FIG. 3C, is chosen as the minimum depth sufficient to trigger crack initiation during the subsequent mechanical loading through selection of one or more of the laser parameters. Note that FIG. 3C shows a cross-section of the electrode 202 or 204, which are formed from the CNT paper 300. It is noted that the pre-cracking depth h is smaller than the thickness H of the electrode 202/204. In one application, a density of 3 cracks/mm was chosen as illustrated in FIG. 3B. This spacing could be optimized before usage to ensure a good piezoresistive response of the electrodes. Other spacings could be considered and would modify the sensor sensitivity following the transmission line equations. The study performed herein uses the 3 cracks/mm spacing, but other configurations can be readily explored. A diameter of the laser beam 332 is about 30 μm, which means that a width of each pre-crack 320 is about 30 μm. Other values may be used if the width is smaller than 100 μm. A length of the pre-cracks can be about 5 mm, and a length of the entire electrode having the pre-cracks may be about 15 mm. The SWCNT paper 300 is shown in FIG. 3B being cut into a rectangular strip having 15×5 mm dimensions, for example, using a laser-cutting machine.

Figure 3D:
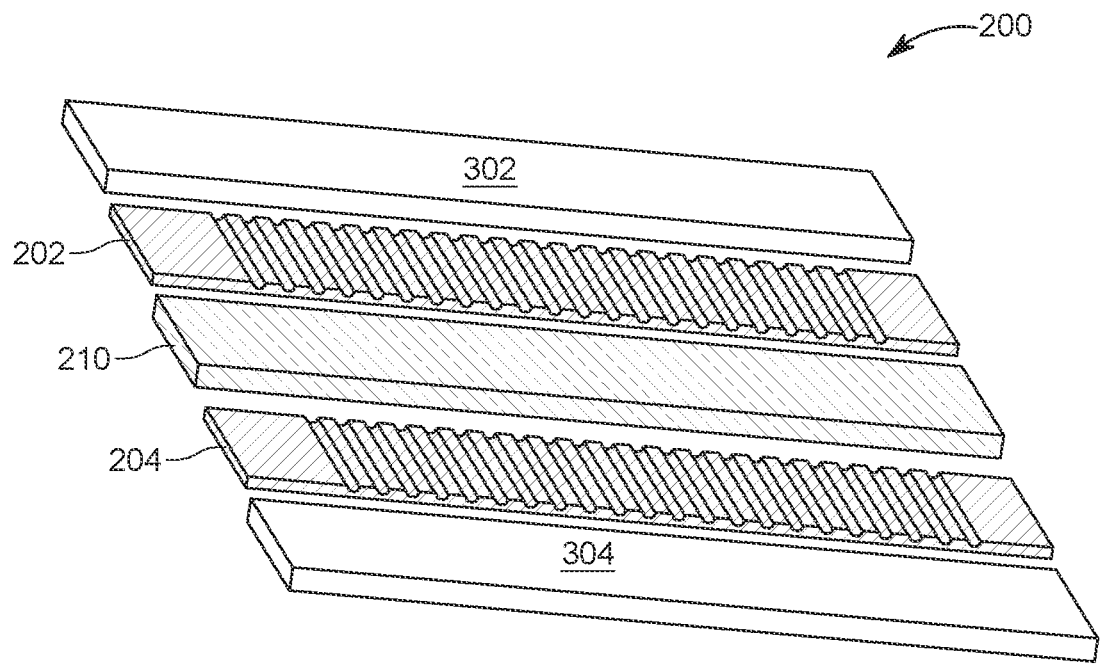

Next, the cut SWCNT papers 300 having the pre-cracks 320 shown in FIG. 3B, which is effectively the electrodes 202 and 204, are stacked together with protection layers 302 and 304 on top of each other, starting and ending with the protection layers (e.g., made of PDMS material), as shown in FIG. 3D. Between these protection layers resides the capacitor's bottom electrode 204 and top electrode 202, represented by a strip of laser-engraved SWCNT paper, which are separated by a 0.5 mm-thick PDMS layer, which forms the dielectric layer 210. This process makes the dielectric layer 210 to be sandwiched between two fragmented electrodes 202 and 204, which are protected by two PDMS layers 302 and 304 on the outer sides. Note that the pre-cracks 320 of the top and bottom electrodes 202 and 204 do not have be aligned to each other when the sensor 200 is assembled. However, in one application, the pre-cracks from the two electrodes are aligned. In one application, it is possible to have a different density of the pre-cracks for the two electrodes, for example, the top electrode to have more pre-cracks per unit length than the bottom electrode. In this application or another one, the length and/or widths of the pre-cracks in one electrode may be different from the other electrode. In yet another application, one of the electrodes may have no pre-cracks.

Figure 3E:
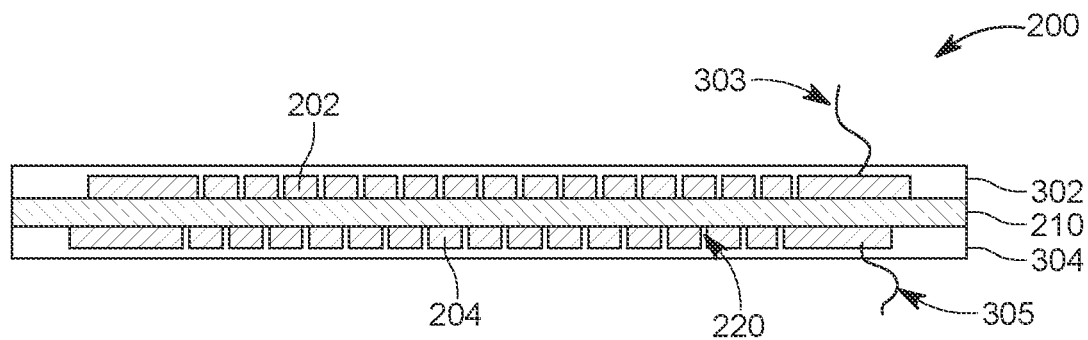
Figure 3F:
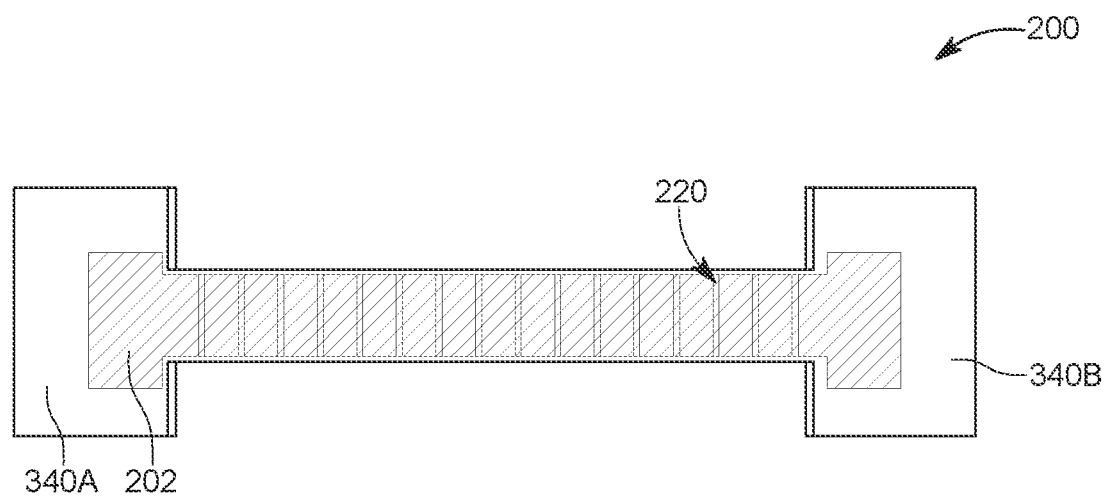

Then, two leads 303 and 305, e.g., two copper wires, are electrically connected to the SWCNT paper strips 300 with silver epoxy and these laminated layers may be cut with a laser-cutting machine to obtain the final sensor 200 shown in FIGS. 3E and 3F. FIG. 3E shows a transversal cross-section of the sensor 200 with the cracks 220 formed in the two electrodes and not being aligned to each other while FIG. 3F shows a top view of the sensor 200 with the formed cracks 220. The sensor 200 in these figures was configured to have two wings 340A and 340B (see FIG. 3F), which are used to apply a strain. In other words, to test the sensor 200, a universal testing machine is used to apply a desired strain to it. The wings 340A and 340B are attached to the machine for applying the strain. In one application, the wings are just an extension of the dielectric layer 210, and thus, they are made of the same material as the dielectric layer. The wings 340A and 340B are shown in FIG. 3F to extend past the electrodes 202 and 204, so that they are not sandwiched between the protection layers 302 and 304. In one embodiment, the wings 340A and 340B are electrically connected to the electrodes 202 and 204, respectively. One skilled in the art would understand that an actual sensor 200 might not need these wings when used in an actual application, in which case the entire sensor 200 can be encapsulated by the protective layers 302 and 304. After placing the sensor 200 in the testing machine, mechanical loading/unloading cycles were applied to apply the desired strain. The evolution of the sensor's capacitance and other electrical quantities, e.g., resistance and impedance, were monitored with an LCR meter or an impedance analyser as now discussed.

Figure 4A:
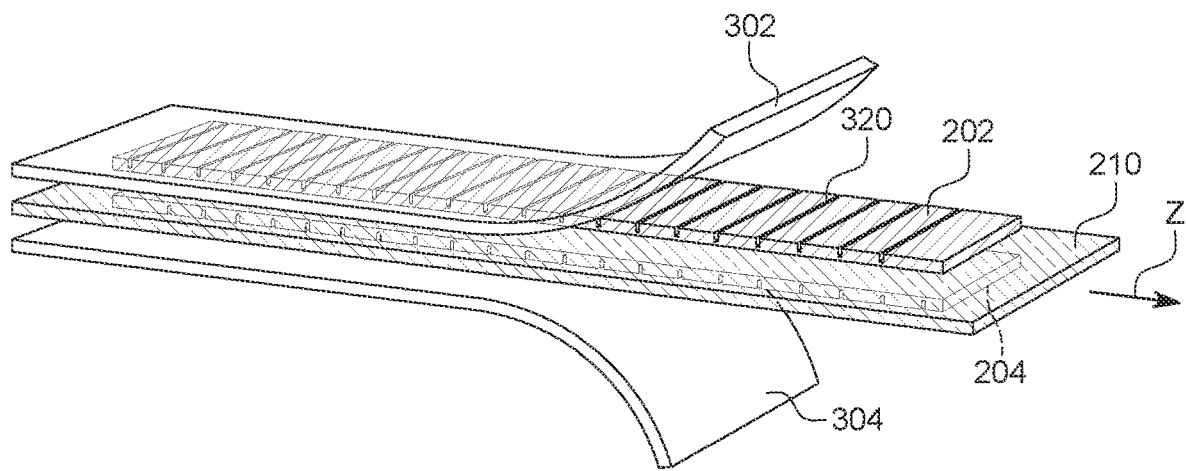
FIGS. 4A to 4E illustrate the effect of applying a strain to the capacitive sensor and how the carbon nanotubes inside the fragmented electrodes are affected by the expanding cracks in the electrodes.
Figure 4B:
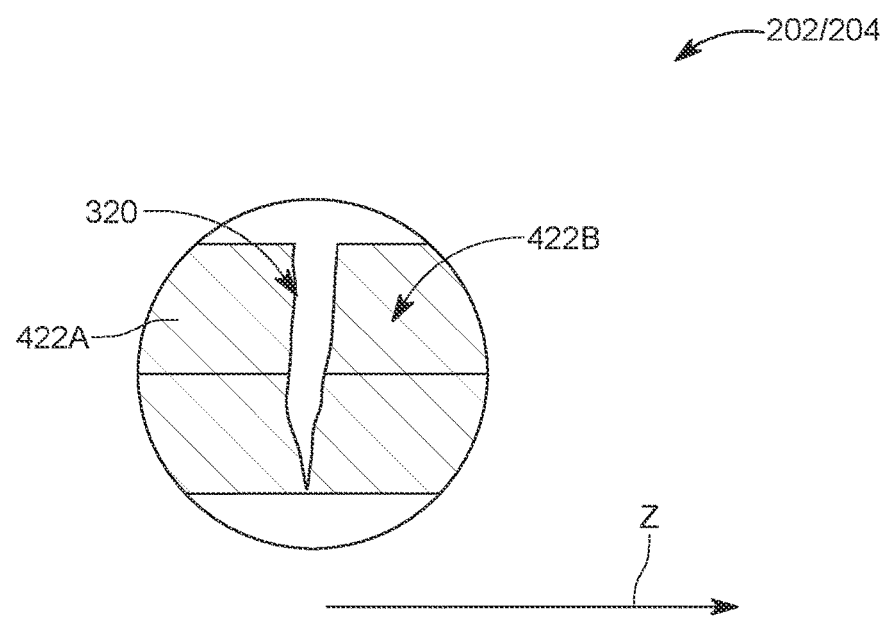
Figure 4C:
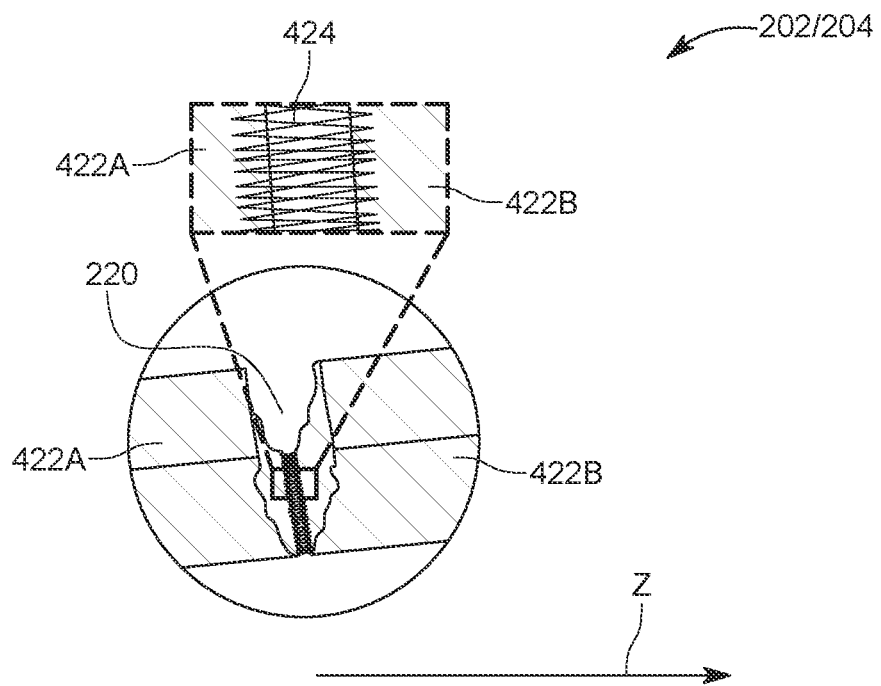
Figure 4D:
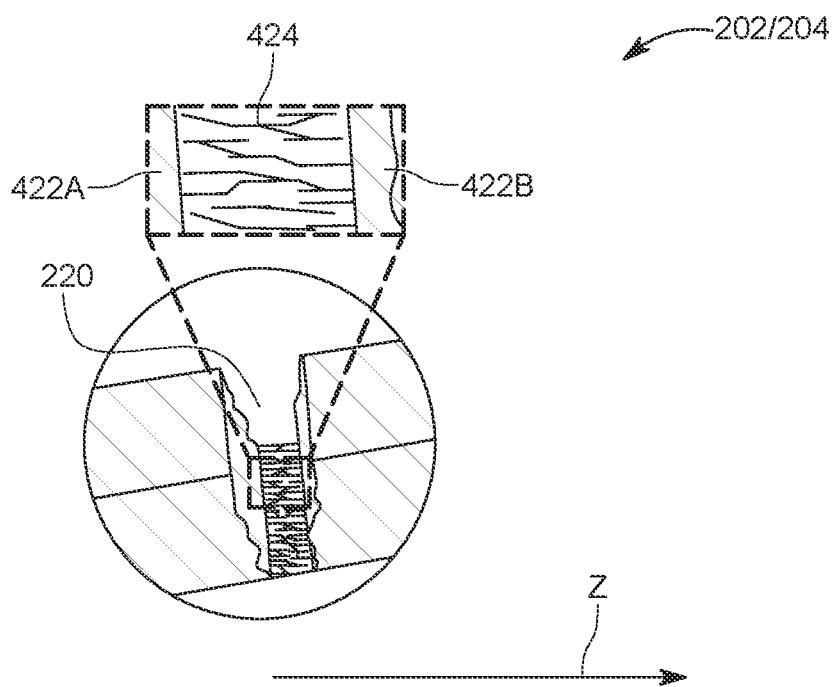
Figure 4E:
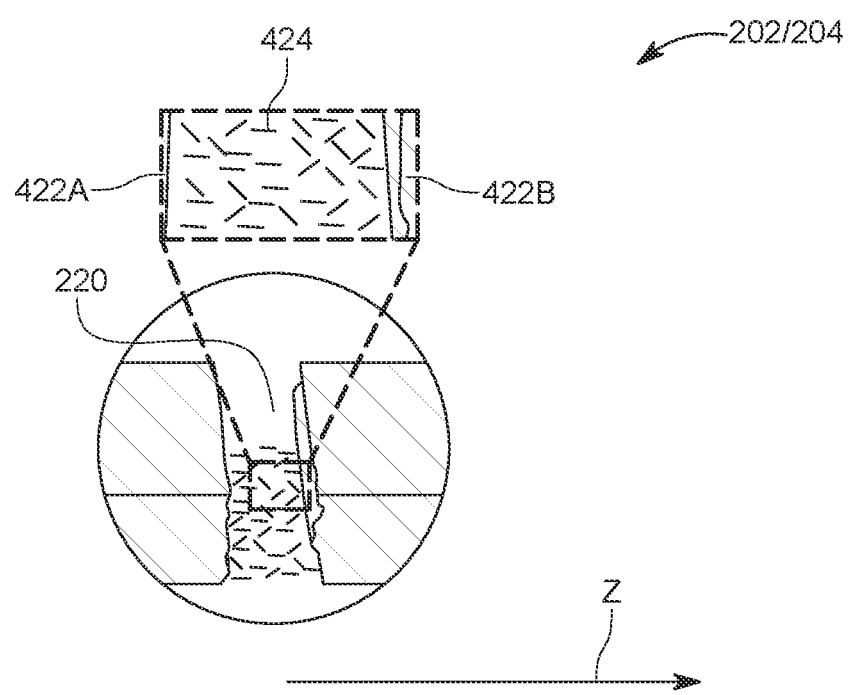

For these tests, the parallel plate capacitor sensor 200 was covered by a PDMS layer from all sides, as shown in FIG. 4A. When the sensor 200 is alternately bent in clockwise and anticlockwise directions, the pre-cracks 320 start to extend or expand along the Z direction, and transform into the crack 220, as shown in FIG. 4B. Note that the pre-crack 320 has a depth selected by the manufacturer of the fragmented electrodes 202 and 204, while a crack 220, which originates from the pre-crack 320, can have any depth, larger than the depth of the pre-crack, up to by smaller than the full thickness of the electrode. In other words, the crack 220 is an evolution of the pre-crack 320, and has a depth larger than the depth of the pre-crack. In one embodiment, the depth of the pre-crack 320 is selected so that upon application of the clockwise/anticlockwise directions, the pre-crack 320 expands to the entire thickness of the electrode, i.e., becomes a full crack 220. Note that FIG. 4B shows two CNT portions 422A and 422B, which is a portion of the electrode that includes many CNT 424, which are shown in more detail in FIG. 4C. As the strain applied to the sensor 200 increases, the crack 220 increases, and the CNT 424 tend to diverge from each other, as shown in FIGS. 4D and 4E, leading to a significant increase in the electrode resistance. It is noted that in FIG. 4E, the CNT 424 are not in electrical contact with each other any more in the crack 220, which makes the resistance of the electrode 202/204 to be almost infinite at that point. Due to the elastic DE 210, when the strain on the electrodes 202 and 204 is removed, the crack 220 diminishes to the point that it almost disappears, and the CNT 424 curl back and are in electrical contact with each other, thus, restoring the electrical resistance of the electrodes. Note that although the crack 220 in FIG. 4E is a full crack, the CNT 424 still extend through the crack, i.e., elements of the paper 300 are not fully severed in the crack.

Figure 5:
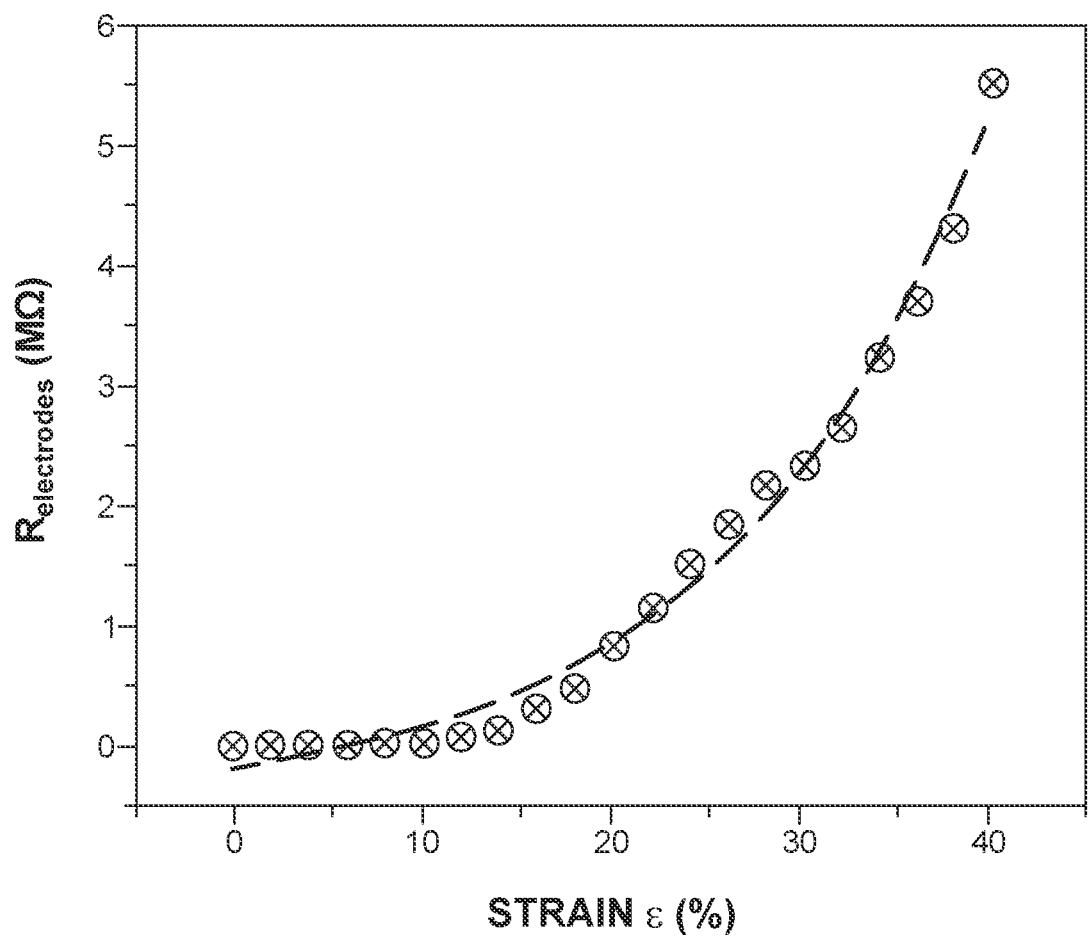
FIG. 5 shows a variation of the resistance of the fragmented electrodes versus the applied strain.
Figure 6:
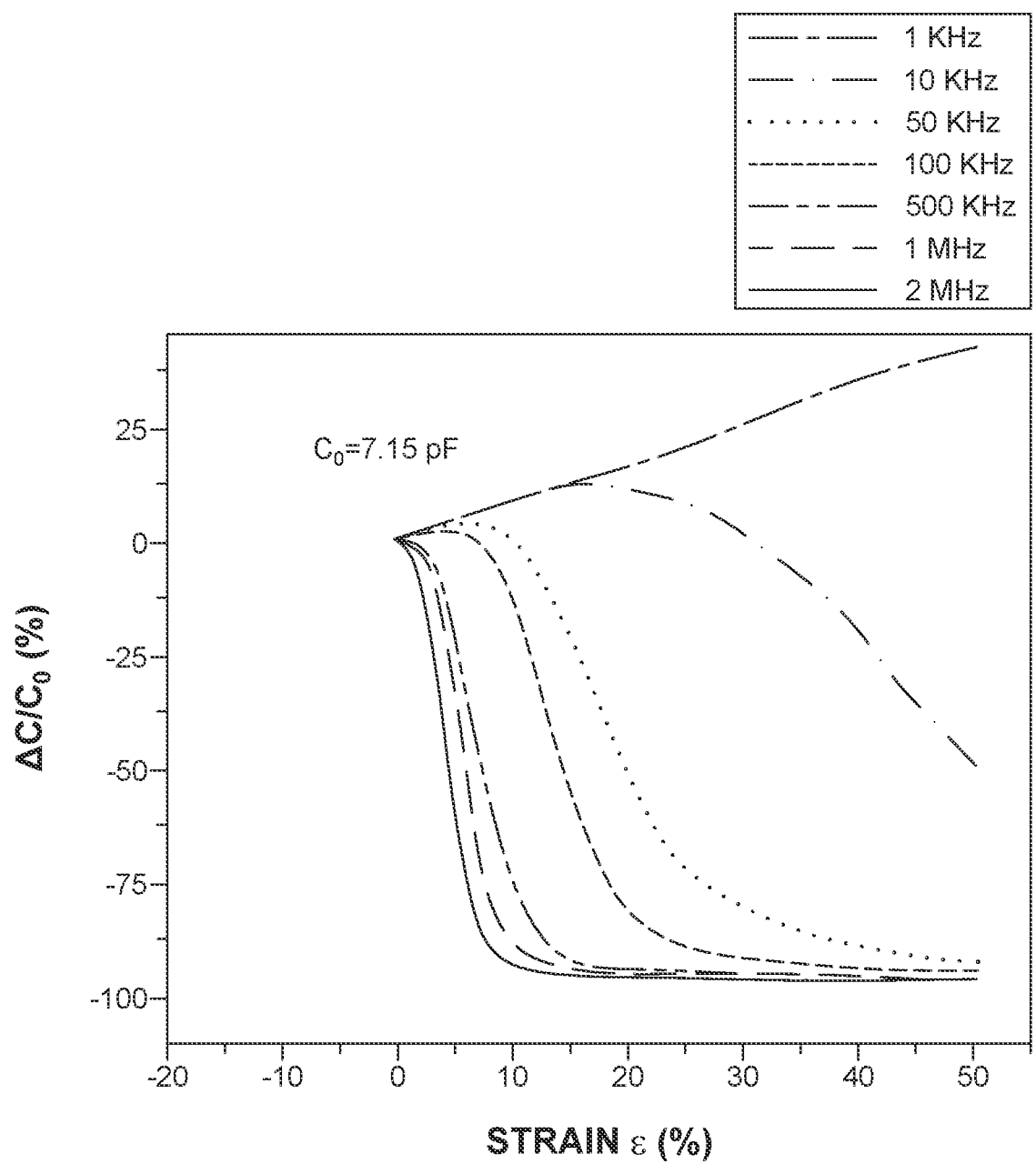
FIG. 6 shows a variation of the relative capacitance of the capacitive sensor with fragmented electrodes versus the applied strain.

The total resistance under strain of the fragmented electrodes 202/204 was measured for the configurations shown in FIGS. 4B to 4E and when plotted as shown in FIG. 5, it shows that the resistance increases in a non-linear fashion with the strain. The influence of the transmission line model on the measured capacitance of the sensor 202 was determined with an electromechanical study, where the capacitance was followed under the mechanical load. As noted in FIG. 6, an effective capacitance variation of −99% was obtained at a high frequency (2 MHz) for an applied strain of less than 10% strain. FIG. 6 shows the capacitance variation of the sensor 200 for various interrogation frequencies.

Figure 7:
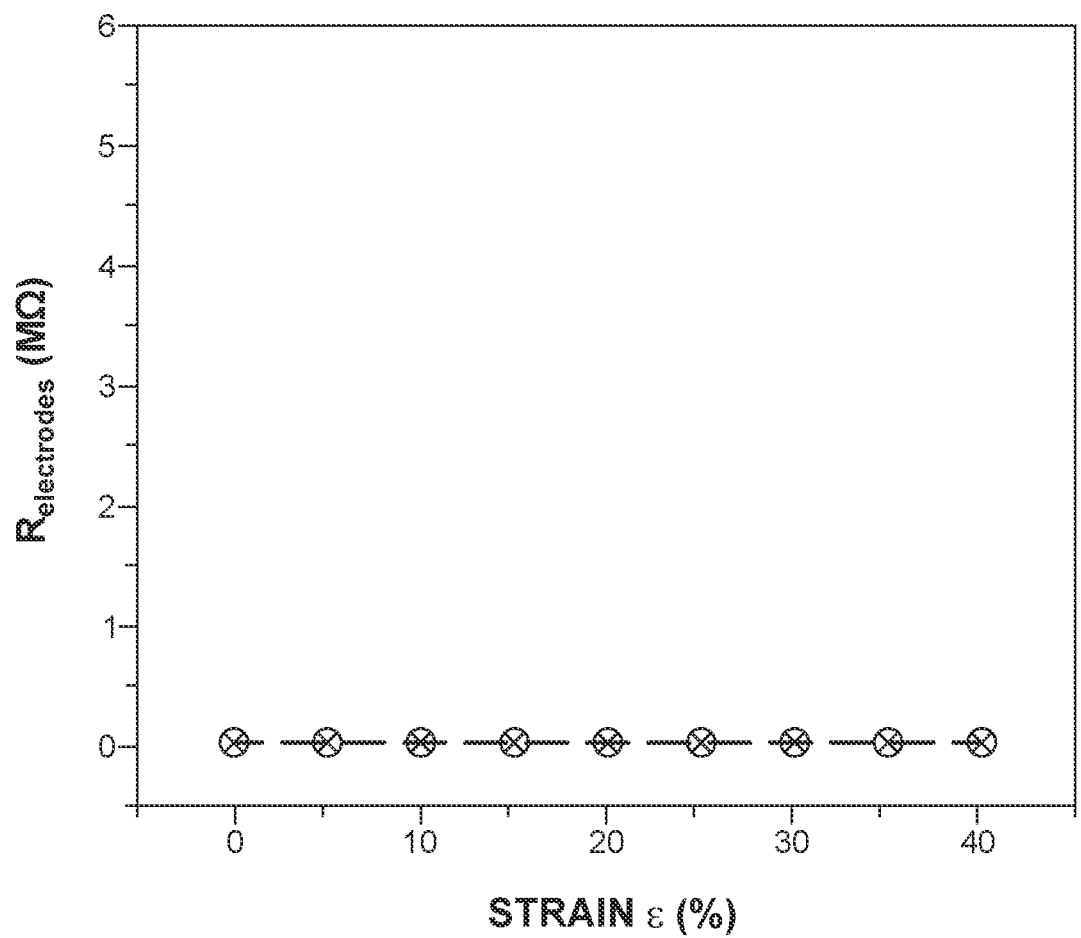
FIG. 7 shows the variation of the resistance of non-fragmented electrodes versus the applied strain.
Figure 8:
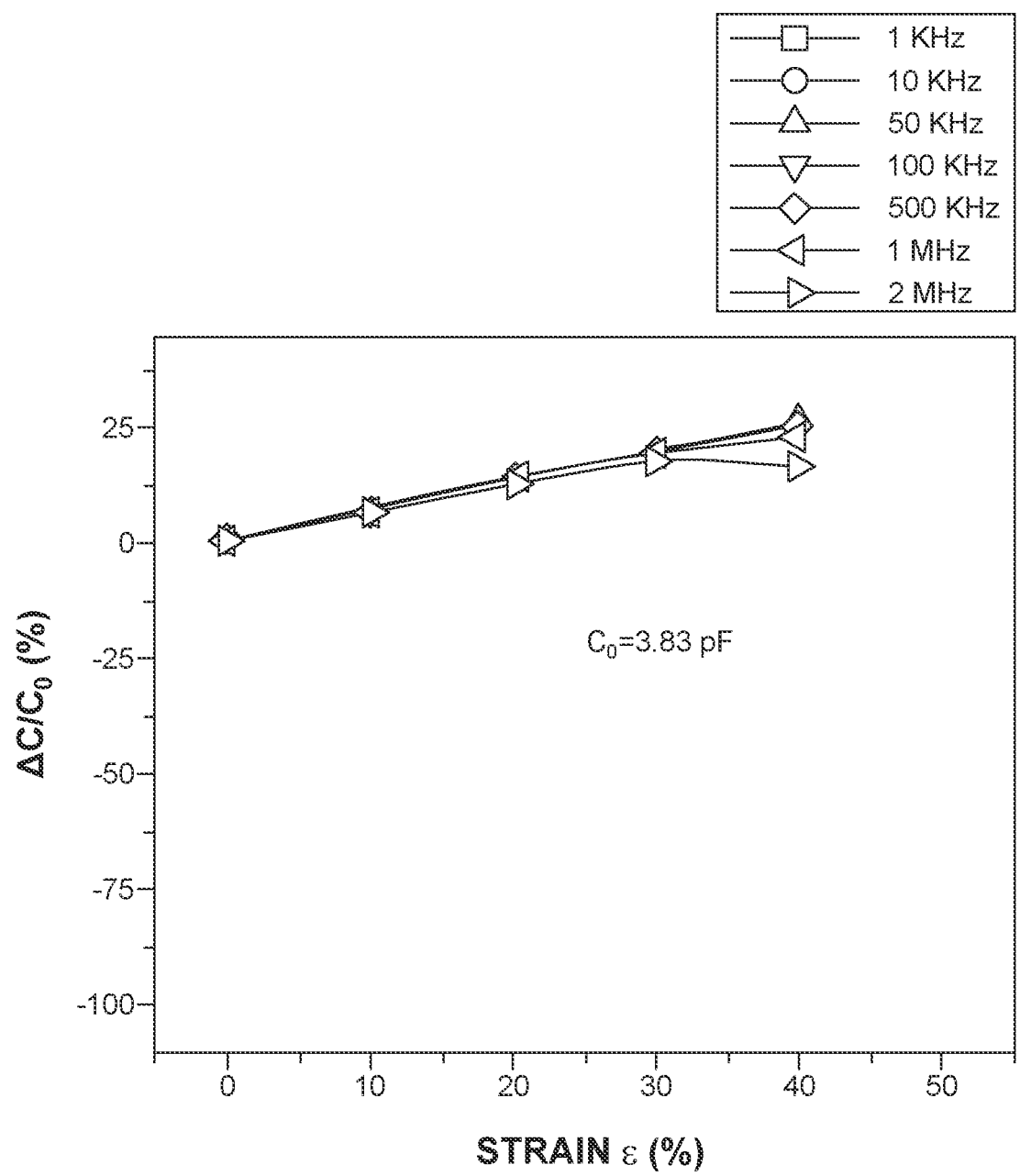
FIG. 8 shows the variation of the relative capacitance of the traditional capacitive sensor versus the applied strain.

For comparison, the inventors have prepared other structures with the same materials and dimensions, but with non-fragmented electrodes. This means that the reference structure was fabricated with very thin CNT layers to avoid cracking in the electrodes under stretching. A finite fracture mechanics has shown that thin films are less prone to fragmentation compared to the thick films. For this reference sensor that does not have fragmented electrodes, FIG. 7 illustrates the change in the electrodes' resistance versus the applied strain. It is noted that this resistance variation did not exceed 3 K$\Omega$, even after 40% applied strain. As expected, the capacitance variation under strain for a classical capacitive strain sensor with a flexible electrode and high conductivity is directly related to the classical geometrical effect. FIG. 8 shows the response of this reference strain sensor under loading. This reference strain sensor exhibits high linearity for a wide range of measurement frequencies. For an applied strain of 40%, the inventors obtained a relative change in the capacitance of 25%, and the GF was 0.7 for the reference capacitor. The effective capacitance value of the non-fragmented sensor was not affected by this moderate change in resistance. It was mainly determined by the pure capacitance of the dielectric layer. Moreover, most of the change resulted from the geometrical variation of the sensor. While the influence of the electrode resistance on the non-fragmented sensor was negligible, the change in the electrode resistance for the sensor with the fragmented electrodes was considerable. The large change in resistance affected substantially the effective capacitance of the sensor.

Figure 9A:
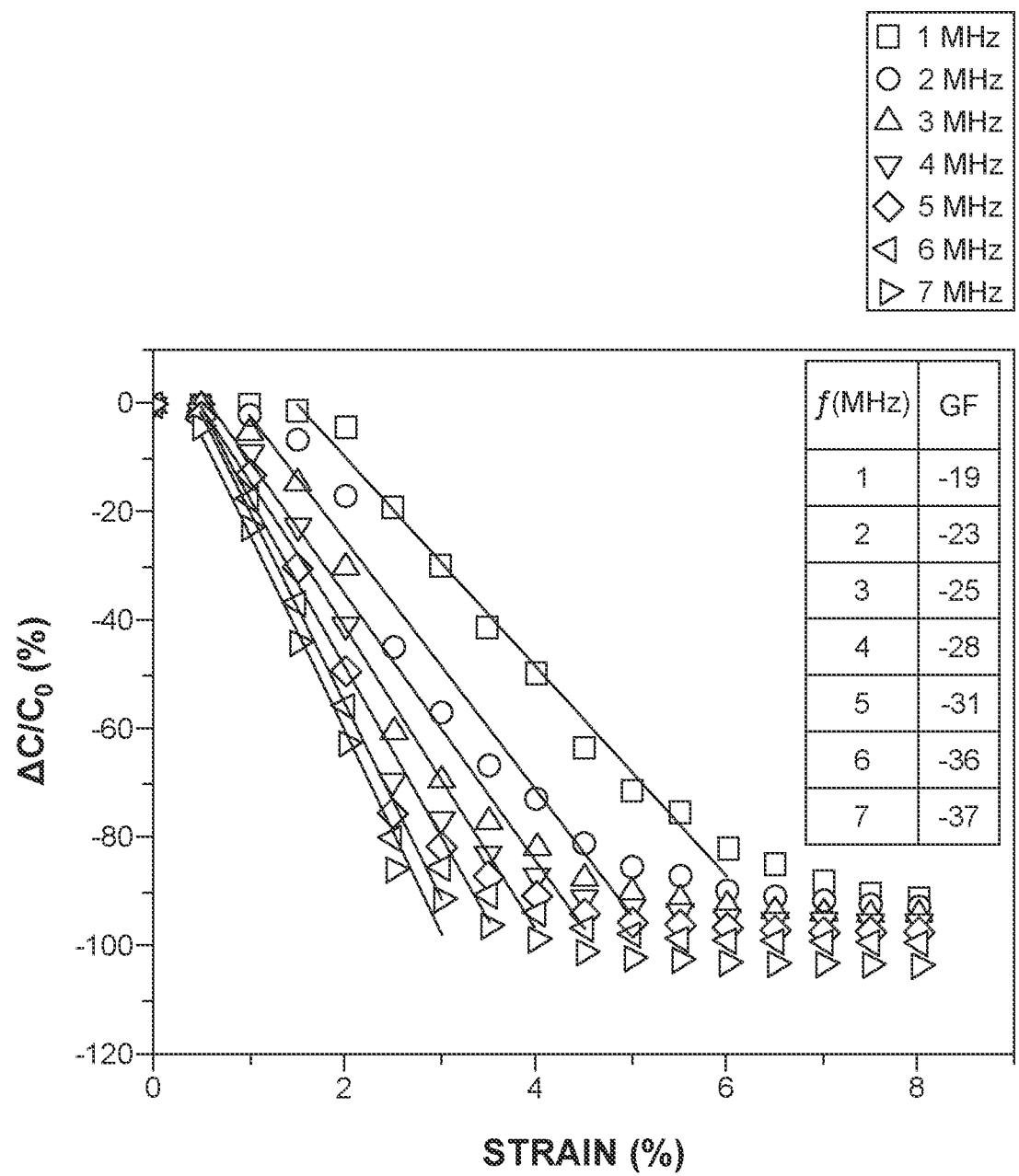
Figure 10:
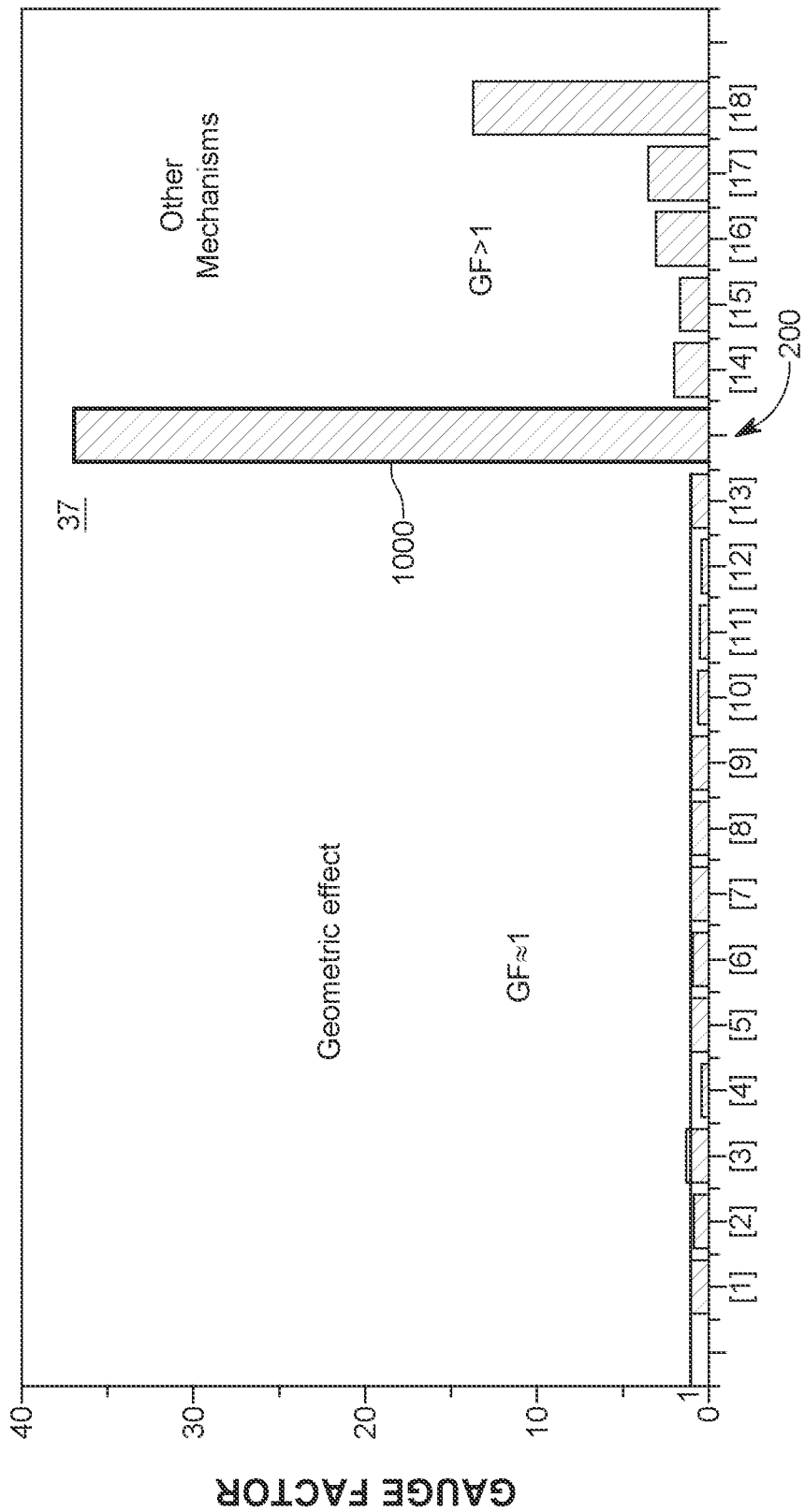
FIG. 10 illustrates the gauge factor of the novel capacitive sensor with fragmented electrodes versus traditional and more recent capacitive sensors.

To further explore the sensor 200's performance, additional features of the sensor 200 were investigated as now discussed. First, the sensor's sensitivity when a low strain is applied was investigated. This regime is the one used by most of the classical engineering applications, as this regime deals with applied strains below a few percentages. A frequency range in which the sensor reacted more to the deformation was targeted to determine the maximum sensitivity that could be achieved. In this case, the capacitance variation of the sensor was monitored with an impedance analyser that allowed to send high frequency interrogation signals up to hundreds of MHz. The range between 1 and 7 MHz was the best measurement frequency for obtaining a high sensitivity, as illustrated in FIG. 9A. The change in resistance did not significantly affect the effective capacitance when the frequency was very low. However, at a higher frequency, a small variation in the resistance was enough to vary the capacitance. Parasitic inductors appeared above 7 MHz, inducing a self-resonance frequency, which was indicative of another phenomenon that is not explored in this application. A 99% variation of the capacitance for the sensor 200 is observed in FIG. 9A for an applied strain of almost 8% at 1 MHz and 3% at 7 MHz. FIG. 10 compares the sensitivity of the previously reported capacitive strain sensors with that of the sensor 200, which is indicated by reference number 1000 in the figure. It is noted that the sensor 200 exceeded a GF of 37 at 7 MHz, which surpasses the GF's classical values, especially at a high frequency. This high sensitivity at low strain is relevant for many applications based on capacitive strain sensors.

Figure 9B:
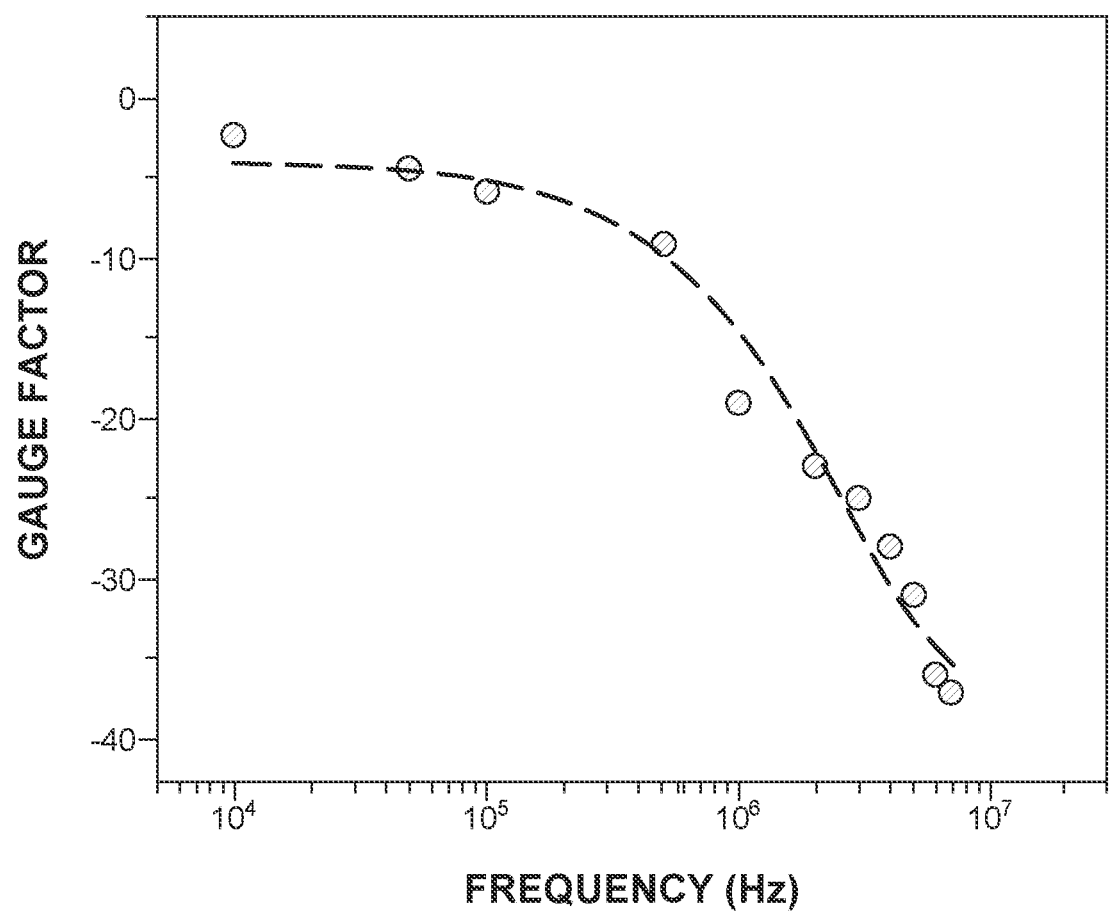
FIG. 9B illustrates the GF as a function of the frequency.

FIG. 9B shows the relationship between sensitivity (GF) and the measurement frequency. The system became more strain sensitive and detected even minimal perturbations when the frequency increased, indicating a new type of strain sensor whose sensitivity was tailorable by adjusting the interrogation frequency. Another feature of the sensor 200 is that the working strain range can be controlled by changing the measurement (interrogation) frequency. Choosing the appropriate frequency allows controlling the strain range and the sensitivity desired for the sensor for specific applications. For example, a 1 MHz measurement frequency allows covering a strain range between 2 and 6% with a sensitivity of 19, while a 7 MHz measurement frequency covers a range of strain between 1 and 3% with a higher sensitivity.

Figure 9C:
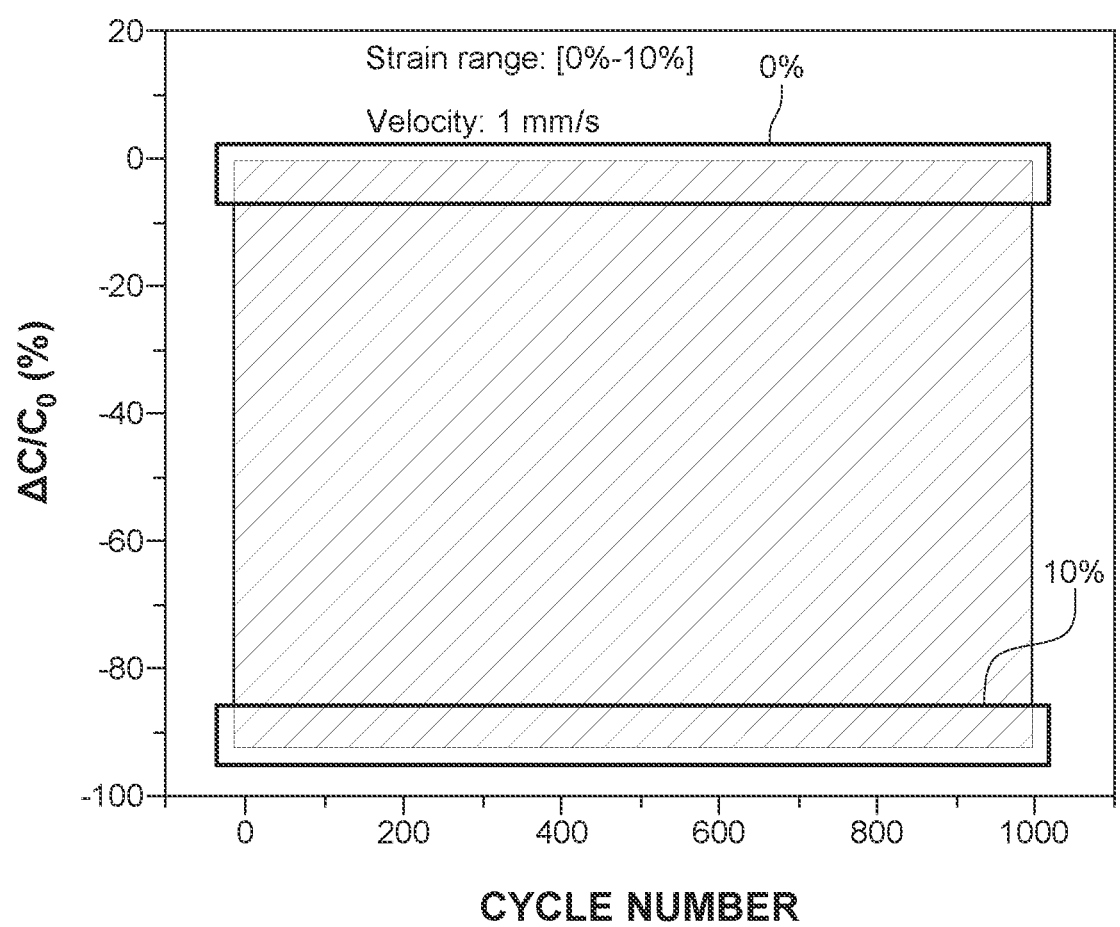
Figure 9D:
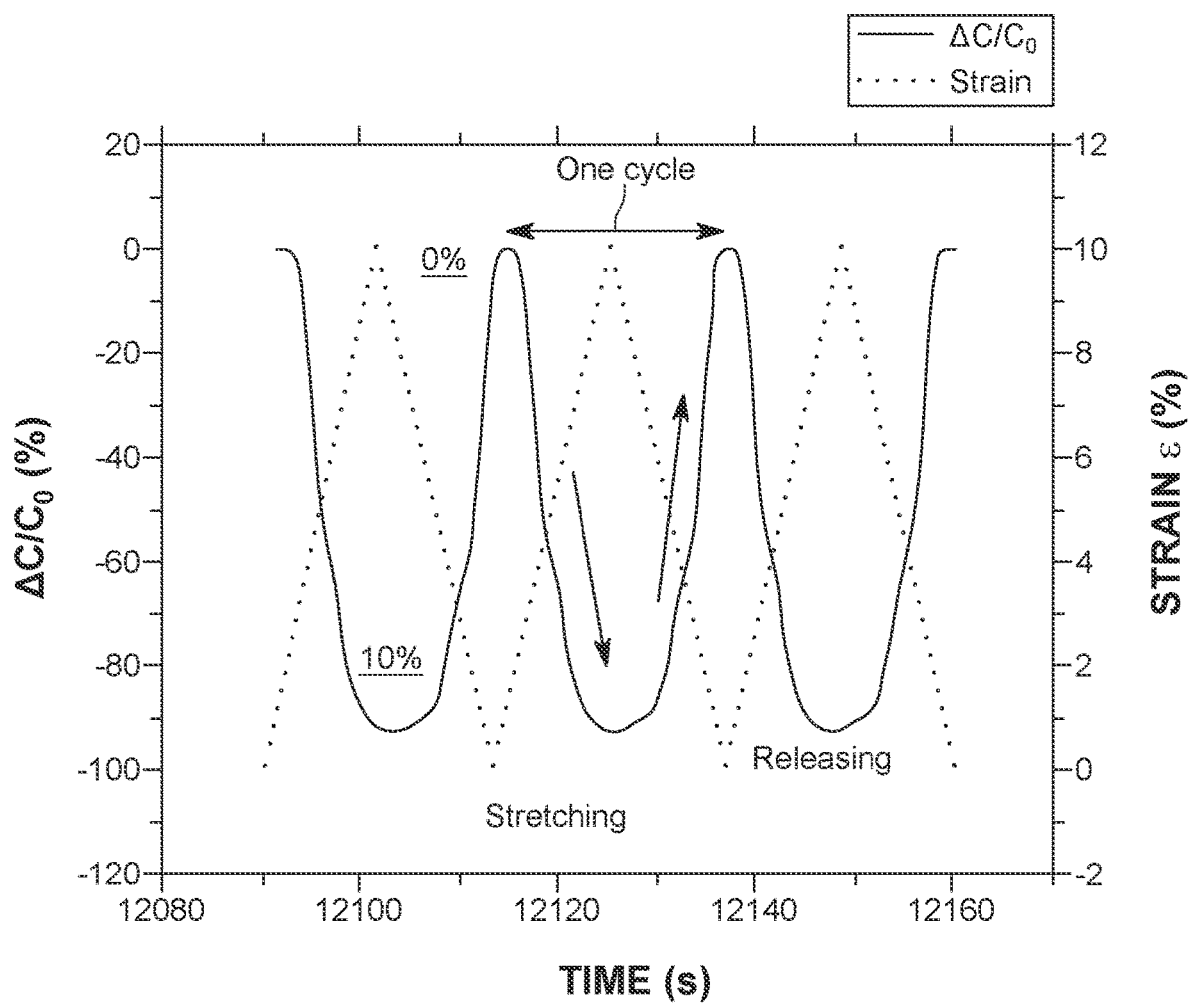

The sensor 200' durability was characterized after more than 1000 cycles with 10% strain. FIGS. 9C and 9D illustrate that after cyclic stretching and relaxing up to 10% strain for 1000 cycles, the drift error for the last cycle was less than 1%. Hence, the capacitive sensor 200 displayed high durability and accuracy over the cyclical tests. FIG. 9D shows a high response rate as the capacitance is switched from a maximum value to a minimum value by precisely following the applied strain. Thus, the new sensor 200 has a high potential for measuring repeated stretching for a long time. Moreover, thanks to the electrode's nature in the sensor 200, its accuracy is not affected by buckling and faults appearing in traditional conductive polymer composites after strain cycles. The reproducibility between different individual sensors is related to the ability to precisely produce the same number of cracks during the fabrication phase. This can be controlled by adopting uniform and precise parameters for the laser beam as discussed above with regard to the pre-cracking process illustrated in FIG. 3B. The PDMS casing covering both sides also provides the sensor with excellent performances because the encapsulated sensor is protected from the effects of external factors, such as temperature and humidity. FIG. 9A shows a good linearity of the sensor in the active strain range for all frequencies. The experimental results confirmed the robust performance of the capacitive strain sensor 200 both in terms of sensitivity and durability. These results also highlight the direct role that the change in the electrode's electrical resistance plays in the effective capacitive response of the sensor.

Figure 11A:
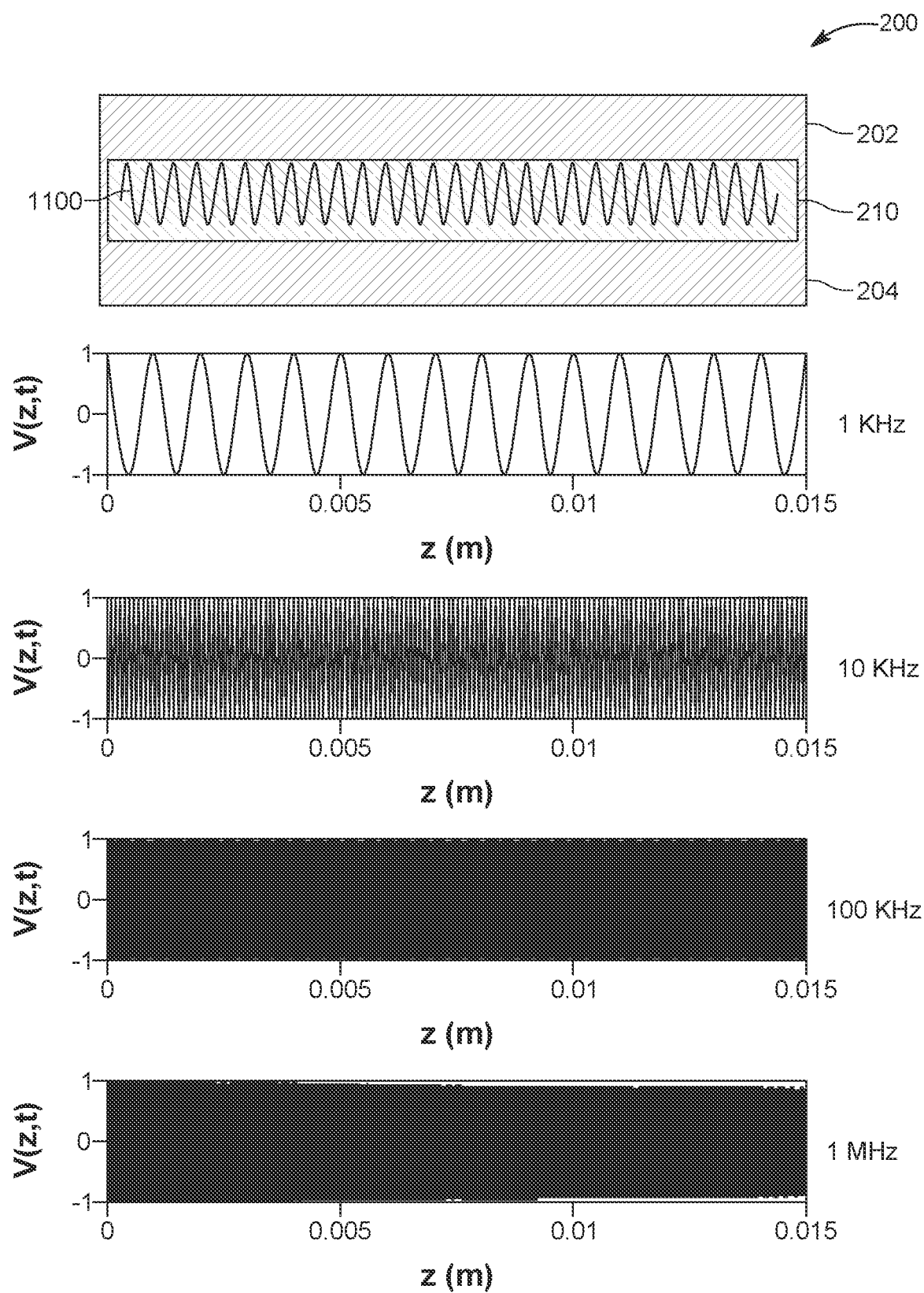
Figure 11B:
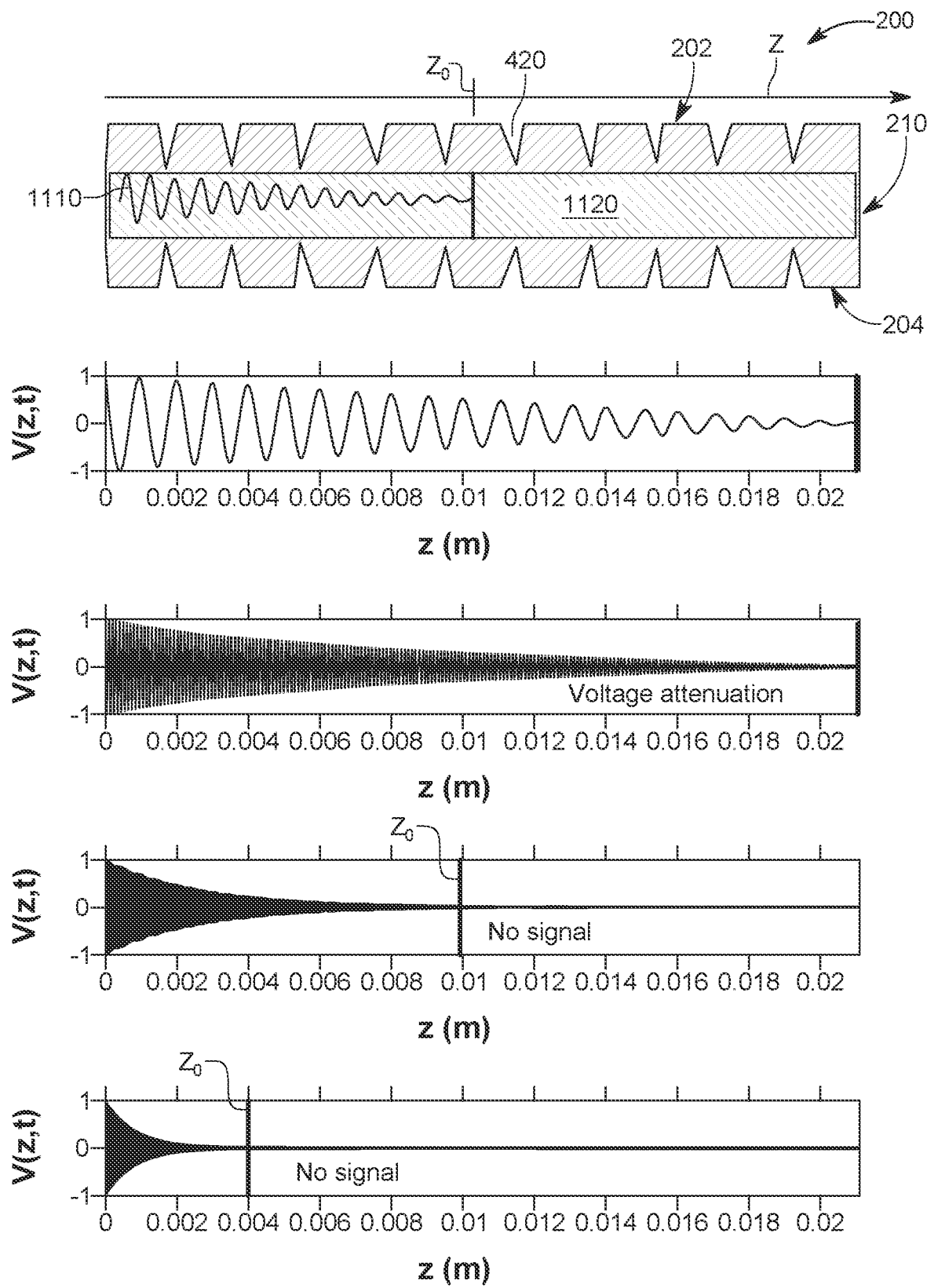
FIG. 11B shows the penetration of the same signal into the novel capacitive sensor with fragmented electrodes.

The mechanism responsible for the change in the capacitance of the sensor 200 is now discussed. The relationship between the electrode resistance per unit length and the voltage wave is described by the transmission line model discussed above with regard to equations (1) and (2). Increasing the resistance significantly, results in an increase of the attenuation constant $\alpha$, which leads to a voltage drop in the capacitor. To illustrate how the voltage changes along the transmission line when strain is applied to the structure, the Telegrapher's equations (equation (1)) were simulated for the interrogation signal propagation for different frequencies while the strain is kept constant. FIG. 11A shows that at rest (for low electrode resistance, i.e., low attenuation constant $\alpha$), a voltage wave 1100 propagates throughout the entire length of the sensor, even at a high frequency (e.g., 1 MHz), indicating that the entire sensor 200 experiences the voltage signal. However, under strain, as shown in FIG. 11B (30% strain applied), due to the high electrode resistance (i.e., a high attenuation constant $\alpha$) generated by the fragmented electrode, the voltage wave amplitude 1110 decreases until it reaches 0 at a distance zo, especially at a high sensing frequency of 100 kHz and above. At 100 kHz, the voltage wave penetrates only the first 10 mm of the sensor and is fully attenuated afterward. Thus, the part 1120 of the sensor 200 located beyond the first 10 mm does not experience any electrical load and does not participate to the effective capacitance. This is a kind of shadowing effect that changes in practice the part of the sensor that is participating to the capacitance as a function of strain and interrogation frequency. The signal drop is related to the attenuation factor $\alpha$ apparent in equation (1), which depends on the product of f×R, which involves both the interrogation frequency and the applied strain.

Two phenomena have been observed from these experiments. First, the penetration depth of the signal 1110 is directly affected by an externally applied strain. Second, this effect can be adjusted by the signal frequency, which is a countermeasure against highly resistant electrodes. Consequently, at the RF, the R-C chain that describes the sensor 200 led to a voltage drop after some penetration distance, as if the total area of the capacitor was reduced. These phenomena explained the relationship between the sensor sensitivity and the sensing frequency.

The electrical measuring instrument used for these experiments only measured the part of the sensor exposed to the voltage wave V(z,t) and hence, finding the extinction distance at which the voltage wave vanishes is desired. This directly defines the effective length of the sensor $L_{\mathit{eff}}$. To determine this distance, in the following it is assumed that for this distance $L_{\mathit{eff}}$, the voltage reaches a small value ($V=V_{min}$) considered small enough to indicate a complete signal extinction (theoretically, the voltage does not equal 0, except when z tends to infinity). Starting from equation (1) and considering only the amplitude, the voltage amplitude reaches $V_{min}$ when $$V_{min} = V_0 e^{-\alpha L_{\mathit{eff}}}. \quad (4)$$

Therefore, the effective length (extinction distance) can be written as follows:

$$L_{\mathit{eff}} = -\frac{\ln\left(\frac{V_{min}}{V_0}\right)}{\sqrt{\pi f C' R'}}. \quad (5)$$

Equation (5) shows the dependency of the effective length on both the strain and frequency. The resistance R of the fragmented electrode 202/204 and also the density of the resistance R', exponentially increases while stretching the sensor as shown in FIG. 5, based on equation:

$$R = R_0 e^{\mu \varepsilon}, \quad (6)$$

where, $R_0$ is the initial electrode resistance without strain, and μ is identified by the exponential fitting of the experimental curve of the electrode resistance as a function of the strain. The geometrical variation of the capacitance is linear under strain, which means that the capacitance per unit length is a constant. The final expression of the effective length for the fragmented electrodes becomes:

$$L_{\mathit{eff}} = \frac{-\ln\left(\frac{V_{min}}{V_0}\right) L_0 (1+\varepsilon)}{\sqrt{\pi f C_0 R_0 e^{\mu \varepsilon} (1+\varepsilon)}}. \quad (7)$$

Upon further insertion of the effective length into the classical capacitance expression, the capacitance of a dielectric layer sandwiched between two fragmented electrodes and measured by an alternative signal, under an applied strain ε is given by:

$$C_{\mathit{eff}} = \frac{\varepsilon_0 \varepsilon_r w_0 L_{\mathit{eff}}}{d_0} = C_0 (1+\varepsilon) \frac{-\ln\left(\frac{V_{min}}{V_0}\right)}{\sqrt{\pi f C_0 R_0 e^{\mu \varepsilon} (1+\varepsilon)}} = C_0 (1+\varepsilon) g(f, R). \quad (8)$$

This equation highlights a new relationship between the strain and the effective capacitance that is true for the sensor 200. This relationship is more than a purely geometrical effect, as in the classical capacitor strain sensor, for which $C = C_0 (1+\varepsilon)$ under strain. This relationship also has an additional term g(f,R), which depends on the frequency and resistance of the sensor. This additional term is present only because the electrode(s) 202/204 is fragmented when strained. Because of this term, the GF can be much larger than 1, as shown in FIG. 10, which is not possible for a traditional capacitor.

Figure 12A:
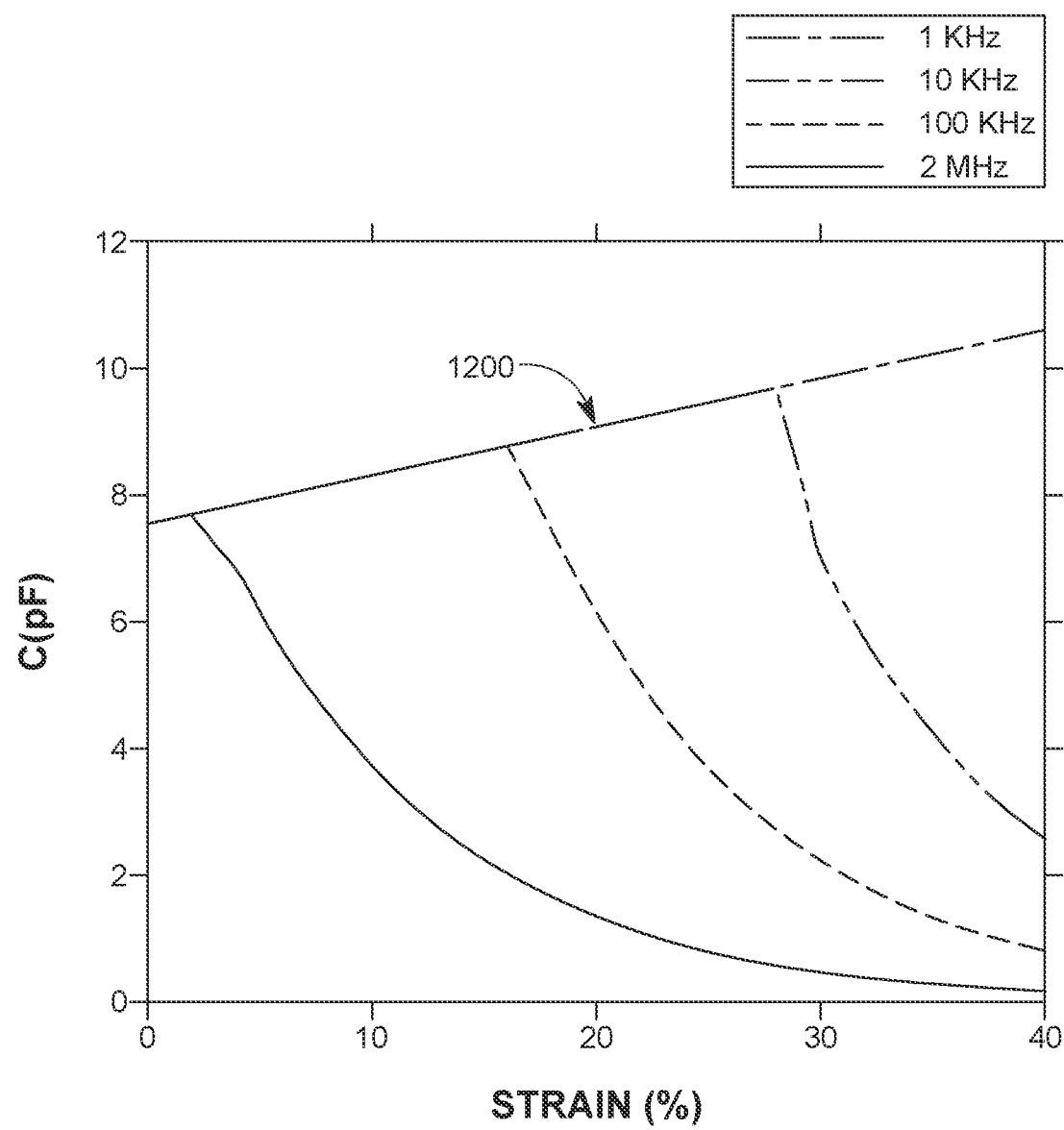
FIG. 12A shows the analytical results of the sensor capacitance and FIG. 12B shows the experimental results of the sensor capacitance for the capacitive sensor having fragmented electrodes.
Figure 12B:
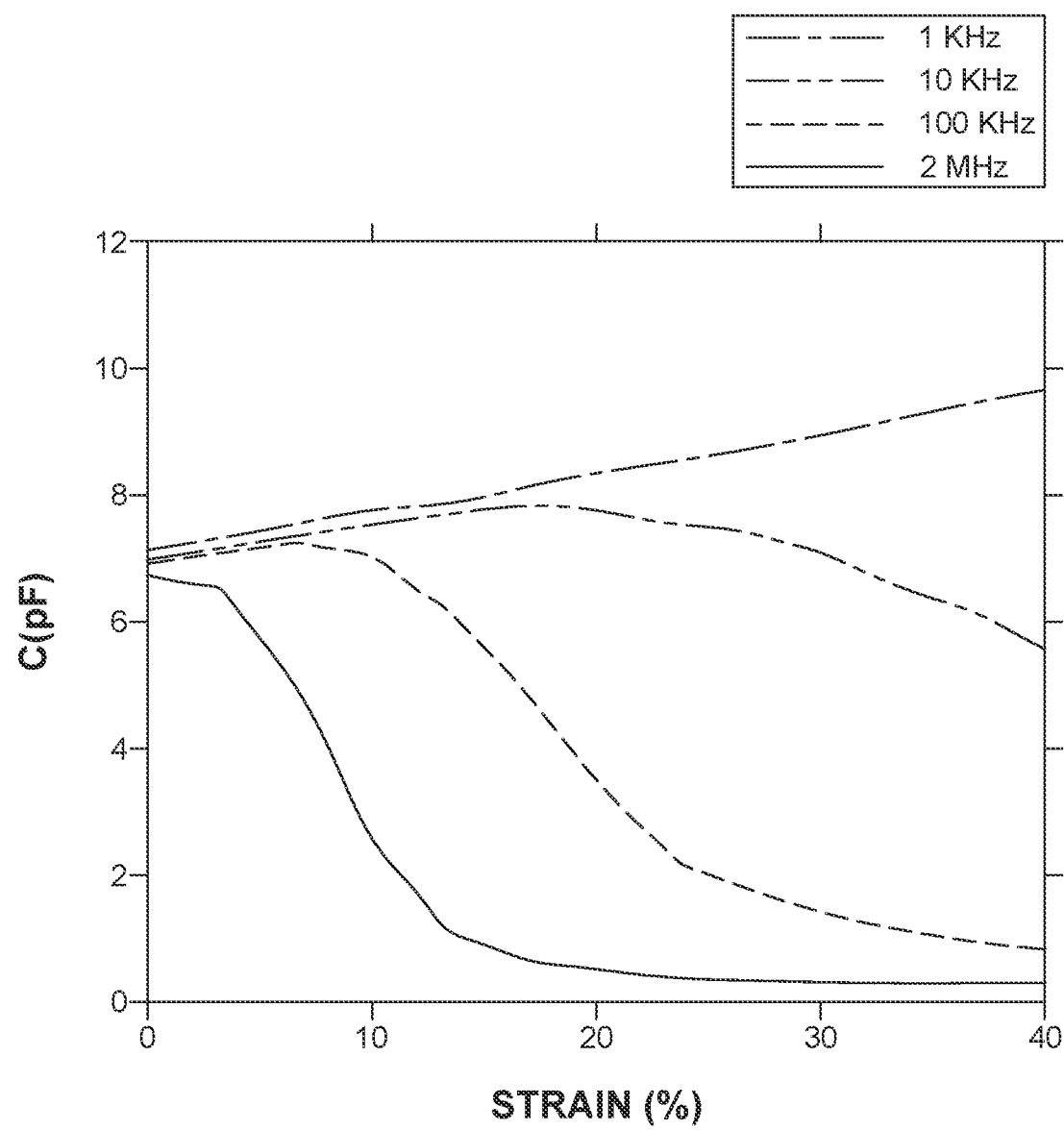

At a low frequency, the voltage $V_{min}$ becomes equal to the voltage $V_0$, while the factors $\sqrt{\pi f C_0 R_0 e^{\mu \varepsilon} (1+\varepsilon)}$ are approaching 0, which makes the g(f,R) term to tend toward 1. In this case, the capacitance variation is described by the classical phenomenon. At a high frequency (e.g., kHz to MHz), the g(f,R) factor dominates, and the capacitance begins to decrease. Thus, the effective capacitance can be controlled by changing the interrogating signal frequency and the applied strain at the same time. FIG. 12A shows the analytical results at different operating frequencies using equation (8) and assuming that $V_{min} = 0.1 V_0$. The figure depicts the presence of a strain threshold 1200 similar to that experimentally observed (see FIG. 12B), marking the beginning of the second phenomenon (i.e., the dominance of the g(f,R) factor). In addition, a drop in the capacitance following the frequency increase is shown in both figures. At 1 kHz, the entire sensor length is active, even for a high strain. On the contrary, at a high frequency, the sensor loses part of its structure. This C-ε-f relationship shows a good correlation with the experimental results, confirming the robustness of the transmission line model to study the capacitance variation of the strain sensor 200 with fragmented electrodes. While the previous embodiments show that both electrodes 202 and 204 are fragmented, it is possible that only one electrode is fragmented and the other is a traditional electrode.

The embodiments discussed above present a new generation of a capacitive strain sensor, which is based on highly piezoresistive electrodes. It was shown that the large change in the electrode's resistance results in a new capacitance variation mechanism because the interrogating signal penetration strongly depends on the strain and the resistance of the electrode, well beyond the classical geometrical factor. An analytical model based on the transmission line theory was used to explain the electrical signal dissipation concept on the sensor's length, which allowed to establish a new relationship between the capacitance of the sensor and the strain and the signal frequency measurement. The SWCNT network in the crack of a fragmented CNT paper plays a key role by enlarging the resistance range up to $10^6$ with a recorded high GF of $10^7$ under strain. This fragmented SWCNT paper electrode made this concept unique and special in terms of its high sensitivity to low strain detection, which was represented by its important GF (i.e., 37 at 7 Mz). The capacitive sensor 200 described herein represents a qualitative leap in the potential of capacitive sensors compared to pre-existing sensors with GFs often not exceeding 1. The relationship between the sensor's sensitivity and the injected signal frequency demonstrates that it is possible to control the sensor's sensitivity by changing the sensing frequency.

Figure 13:
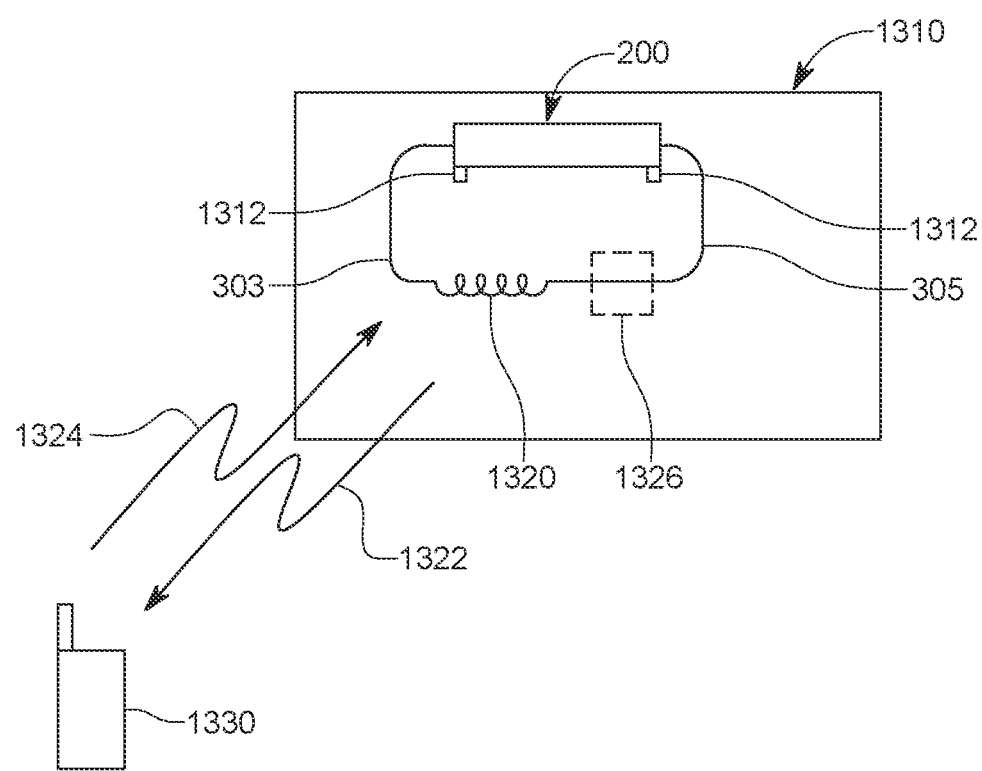
FIG. 13 shows a system for determining a strain into a structure based on the capacitive sensor having the fragmented electrodes.

An application of the sensor 200 to is now discussed with regard to FIG. 13. The capacitive sensor 200 is attached, for example, on a structure 1310, which may be a bridge, a building, for monitoring the structural health of the structure, or the skin of a person, for medical applications of human motion detection, etc. The ends of the sensor 200 are fixedly attached to the structure 1310, for example, with glue 1312, so that, if the structure experiences any strain, that strain is transmitted to the sensor 200. Any other means may be used for fixing the ends of the sensor 200 to the structure 1310. The leads 303 and 305 of the sensor 200 are electrically connected to an inductor 1320 so that, any electrical signal generated by the sensor 200 due to the application of a strain to the sensor, is transformed into a wireless signal 1322, which is sent to an external device 1330 for processing. The external device 1330 may be a smartphone or any processing unit capable of receiving in a wireless manner electrical signals. Based on the received signal 1322, and the dependency between the applied strain and the change in the capacitance of the sensor, which is, for example, illustrated in FIG. 6 and described in equation (8), the external device 1330 is able to calculate the strain experienced by the structure 1310. It is noted that for this passive implementation of the sensor 200, the external device 1330 sends an interrogation signal 1324, having a given frequency, which is recorded by the external device. This signal is received by the inductor 1320 and sent to the sensor 200. The effective capacitance of the sensor 200 modulates the interrogation signal 1324 and generates the response signal 1322, which is emitted by the inductor 1320 back to the external device 1330. Note that the external device 1330 may be configured to adjust the frequency of the interrogation signal 1324 based on the expected sensitivity of the monitored structure as the sensor 200 exhibits different sensitivities for different interrogation signals.

Alternatively, the passive configuration of the sensor 200 can be changed to an active configuration, in which a power source and an interrogation generation device 1326 may be used instead of the inductor 1320. For this case, the device 1326, which is also attached to the structure 1310, generates the interrogation signal and also transmits the signal modulated by the sensor, to the external device. In one embodiment, it is also possible to configure the device 1326 to even process the modulated signal and generate an indicator, for example, an alarm, if a measured strain is larger than a threshold value.

Figure 14:
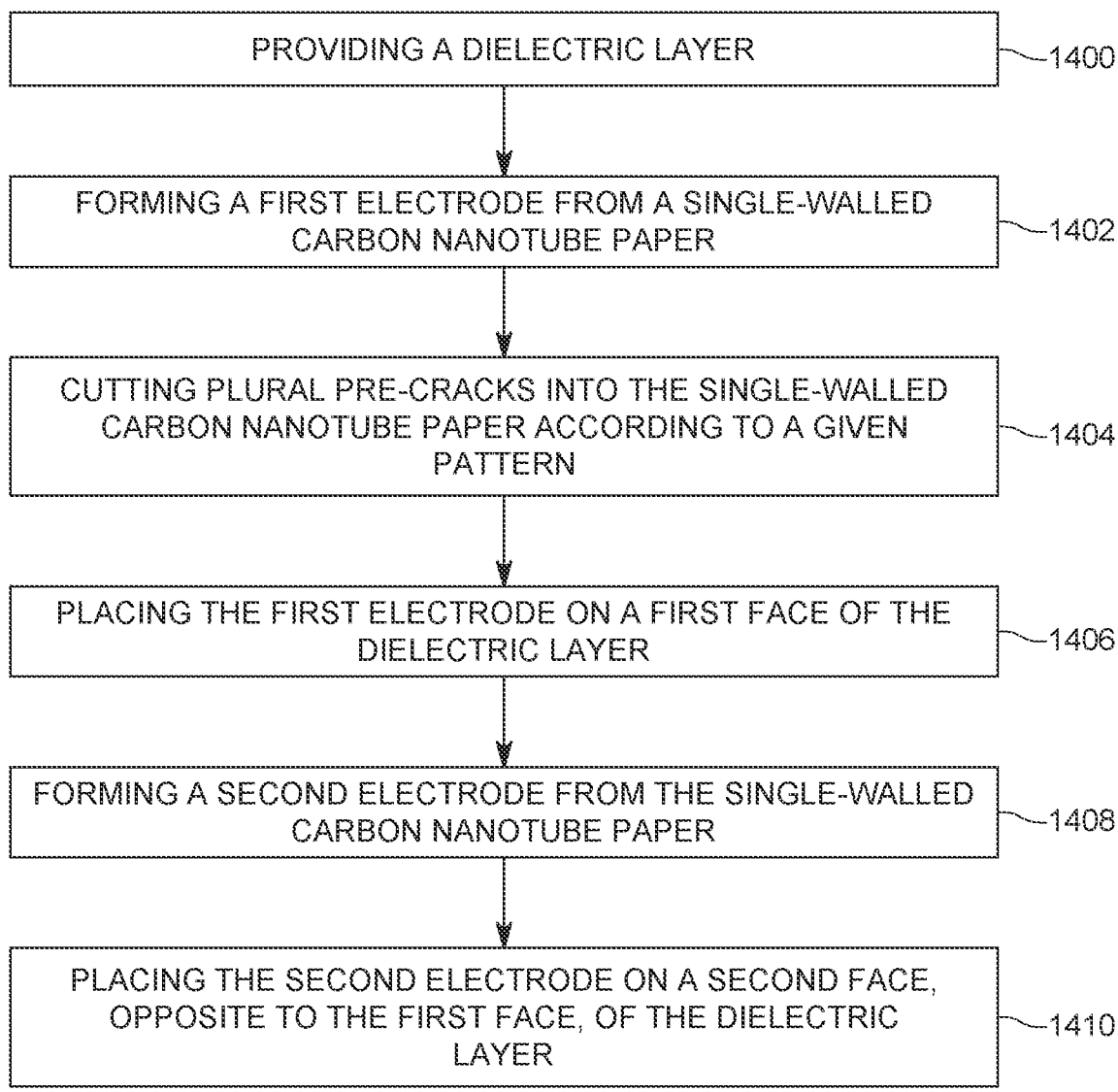
FIG. 14 is a flow chart of a method for manufacturing the capacitive sensor having the fragmented electrodes.

A method for making the capacitive strain sensor 200 is now discussed with regard to FIG. 14. The method includes a step 1400 of providing a dielectric layer 210, a step 1402 of forming the first electrode 202 from a single-walled carbon nanotube paper or other conductive material, a step 1404 of cutting plural pre-cracks 320 into the single-walled carbon nanotube paper according to a given pattern, a step 1406 of placing the first electrode 202 on a first face of the dielectric layer 210, a step 1408 of forming a second electrode 204 from the single-walled carbon nanotube paper, and a step 1410 of placing the second electrode 204 on a second face, opposite to the first face, of the dielectric layer 210. Optionally, a step of encapsulating the entire structure, from both ends, into a protective layer is possible.

In one application, the pattern includes straight parallel lines. The single-walled carbon nanotube paper has a thickness of about 100 μm. The method may also include a step of cutting into the second electrode plural pre-cracks made according to the pattern. In one application, the plural pre-cracks in the first and second electrodes do not extend through the entire thickness of the first and second electrodes. The method may also include a step of selecting a depth of the plural pre-cracks so that the pre-cracks become full cracks that extend through an entire thickness of the first and second electrodes when the electrodes are bent, or a strain is applied to the sensor, or any other technique that transforms the pre-cracks into full cracks. In one application, the dielectric layer includes an elastomer and a relative capacitance of a capacitor formed by the dielectric layer and the first and second electrodes decreases with an increase in an applied strain. In this or another application, the dielectric layer includes an elastomer and a resistance of the electrodes of a capacitor formed by the dielectric layer and the first and second electrodes increases in a non-linear manner with an increase in an applied strain. A gauge factor of a capacitor formed by the dielectric layer and the first and second electrodes is larger than one under strain. In yet another embodiment or the same embodiment, a penetration depth of an interrogation signal injected into a capacitor formed by the dielectric layer and the first and second electrodes depends on (1) a strain applied to the capacitor, and (2) a frequency of the interrogation signal.

The disclosed embodiments provide a super-sensitive capacitive strain sensor that uses one or more fragmented electrodes. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] S. Yao and Y. Zhu, "Wearable multifunctional sensors using printed stretchable conductors made of silver nanowires," *Nanoscale*, vol. 6, no. 4, pp. 2345-2352, 2014, doi: 10.1039/C3NR05496A.

[2] L. Cai et al., "Super-stretchable, transparent carbon nanotube-based capacitive strain sensors for human motion detection," *Sci. Rep.*, vol. 3, no. 1, pp. 3048, October 2013, doi: 10.1038/srep03048.

[3] R. Nur, N. Matsuhisa, Z. Jiang, M. O. G. Nayeem, T. Yokota, and T. Someya, "A highly sensitive capacitive-type strain sensor using wrinkled ultrathin gold films," *Nano Lett.*, vol. 18, no. 9, pp. 5610-5617, September 2018, doi: 10.1021/acs.nanolett.8b02088.

[4] H. Nesser, J. Grisolia, T. Alnasser, B. Viallet, and L. Ressier, "Towards wireless highly sensitive capacitive strain sensors based on gold colloidal nanoparticles," *Nanoscale*, vol. 10, no. 22, pp. 10479-10487, June 2018, doi: 10.1039/C7NR09685B.

[5] S. R. Kim, J. H. Kim, and J. W. Park, "Wearable and transparent capacitive strain sensor with high sensitivity based on patterned Ag nanowire networks," *ACS Appl. Mater. Interfaces*, vol. 9, no. 31, pp. 26407-26416, August 2017, doi: 10.1021/acsami.7b06474.

[6] Y. Xin, J. Zhou, X. Xu, and G. Lubineau, "Laser-engraved carbon nanotube paper for instilling high sensitivity, high stretchability, and high linearity in strain sensors," *Nanoscale*, vol. 9, no. 30, pp. 10897-10905, 2017, doi: 10.1039/C7NR01626C.

[7] F. Carpi, D. D. Rossi, R. Kornbluh, R. E. Pelrine, and P. Sommer-Larsen, *Dielectric Elastomers as Electromechanical Transducers: Fundamentals, Materials, Devices, Models and Applications of an Emerging Electroactive Polymer Technology*. Elsevier, 2011.

[8] D. Xu, A. Tairych, and I. A. Anderson, "Stretch not flex: programmable rubber keyboard," *Smart Mater. Struct.*, vol. 25, no. 1, p. 015012, November 2015, doi: 10.1088/0964-1726/25/1/015012.

[9] D. Xu, A. Tairych, and I. A. Anderson, "Where the rubber meets the hand: Unlocking the sensing potential of dielectric elastomers," *J. Polym. Sci. Part B Polym. Phys.*, vol. 54, no. 4, pp. 465-472, 2016, doi: 10.1002/polb.23926.

What is claimed is:

1. A capacitive strain sensor configured to measure a strain, the sensor comprising:
    a dielectric layer;
    a first electrode placed on a first face of the dielectric layer; and
    a second electrode placed on a second face of the dielectric layer,
    wherein the first electrode is formed of a single-walled carbon nanotube paper, and
    wherein the single-walled carbon nanotube paper has plural pre-cracks made according to a pattern and a depth of the pre-cracks in the first electrode is smaller than a thickness of the first electrode.

2. The sensor of claim 1, wherein the pattern includes straight parallel lines.

3. The sensor of claim 1, wherein the single-walled carbon nanotube paper has a thickness of about 100 μm.

4. The sensor of claim 1, wherein the second electrode is formed of the single-walled carbon nanotube paper, and the single-walled carbon nanotube paper has plural pre-cracks made according to the pattern.

5. The sensor of claim 4, wherein the plural pre-cracks in the second electrode do not extend through an entire thickness of the second electrode.

6. The sensor of claim 4, wherein a depth of the plural pre-cracks in the first and second electrodes is selected so that the pre-cracks become full cracks that extend through an entire thickness of the first and second electrodes when a strain is applied to the sensor.

7. The sensor of claim 1, wherein the dielectric layer includes an elastomer and a relative capacitance of a capacitor formed by the dielectric layer and the first and second electrodes decreases with an increase in an applied strain.

8. The sensor of claim 1, wherein the dielectric layer includes an elastomer and a resistance of the first and second electrodes of a capacitor formed by the dielectric layer and the first and second electrodes increases in a non-linear manner with an increase in an applied strain.

9. The sensor of claim 1, wherein a penetration depth of an interrogation signal injected into a capacitor formed by the dielectric layer and the first and second electrodes depends on (1) a strain applied to the capacitor, and (2) a frequency of the interrogation signal.

10. A method for making a capacitive strain sensor, the method comprising:
    providing a dielectric layer;
    forming a first electrode from a single-walled carbon nanotube paper;
    cutting plural pre-cracks into the single-walled carbon nanotube paper according to a given pattern, wherein a depth of the plural pre-cracks in the first electrode is smaller than a thickness of the first electrode;
    placing the first electrode on a first face of the dielectric layer;
    forming a second electrode from the single-walled carbon nanotube paper; and
    placing the second electrode on a second face, of the dielectric layer.

11. The method of claim 10, wherein the pattern includes straight parallel lines.

12. The method of claim 10, wherein the single-walled carbon nanotube paper has a thickness of about 100 μm.

13. The method of claim 10, further comprising:
    cutting into the second electrode plural pre-cracks made according to the pattern.

14. The method of claim 13, wherein the plural pre-cracks in the first and second electrodes do not extend through the entire thickness of the first and second electrodes.

15. The method of claim 13, further comprising:
    selecting a depth of the plural pre-cracks so that the pre-cracks become full cracks that extend through an entire thickness of the first and second electrodes when a strain is applied to the sensor.

16. The method of claim 10, wherein the dielectric layer includes an elastomer and a relative capacitance of a capacitor formed by the dielectric layer and the first and second electrodes decreases with an increase in an applied strain.

17. The method of claim 10, wherein the dielectric layer includes an elastomer and a resistance of the first and second electrodes of a capacitor formed by the dielectric layer and the first and second electrodes increases in a non-linear manner with an increase in an applied strain.

18. The method of claim 10, wherein a penetration depth of an interrogation signal injected into a capacitor formed by the dielectric layer and the first and second electrodes depends on (1) a strain applied to the capacitor, and (2) a frequency of the interrogation signal.

19. A capacitive strain sensor configured to measure a strain, the sensor comprising:
    a dielectric layer;
    a first electrode placed on a first face of the dielectric layer;
    a second electrode placed on a second face, opposite to the first face, of the dielectric layer; and
    an inductor connected between the first electrode and the second electrode and configured to receive an interrogation signal and generate a signal indicative of a strain applied to the sensor,
    wherein the first electrode is formed of a single-walled carbon nanotube paper, and
    wherein at least one of the first and second electrodes includes a piezoelectric material so that a change in a capacitance of the capacitive strain sensor is negative when stretched.

20. The capacitive strain sensor of claim 19, wherein a change in resistance of the capacitive strain sensor is from ohms to mega ohms when stretched.

21. The capacitive strain sensor of claim 19, wherein a gauge factor is at least 37 at 7 Mhz.

* * * * *